US005159549A

United States Patent [19]

Hallman, Jr. et al.

[11] Patent Number: 5,159,549

[45] Date of Patent: Oct. 27, 1992

[54] MULTIPLE PLAYER GAME DATA PROCESSING SYSTEM WITH WAGER ACCOUNTING

[75] Inventors: John R. Hallman, Jr., Columbia; Richard A. Schrenker, Baltimore, both of Md.

[73] Assignee: Poker Pot, Inc., Baltimore, Md.

[21] Appl. No.: 39,778

[22] Filed: Apr. 16, 1987

Related U.S. Application Data

[63] Continuation of Ser. No. 616,291, Jun. 1, 1984, abandoned.

[51] Int. Cl.5 ........................ G06F 15/44; G06F 15/28

[52] U.S. Cl. ................................ 364/412; 273/138 A

[58] Field of Search ... 364/200 MS File, 900 MS File, 364/412; 273/85 CP, 85 G, 237, 274, DIG. 28, 138 A, 1 E; 340/323 R

[56] References Cited

U.S. PATENT DOCUMENTS

| | | | |
|---|---|---|---|
| 3,420,526 | 1/1969 | Berger | 273/148 R |
| 3,810,627 | 5/1974 | Levy | 273/138 A |
| 3,819,186 | 6/1974 | Hinterstocker | 273/138 A |
| 3,876,208 | 4/1975 | Wachtler et al. | 273/138 A |
| 4,030,764 | 6/1977 | Mattos | 273/148 A |
| 4,052,073 | 10/1977 | Miller | 273/148 R |
| 4,093,215 | 6/1978 | Ballard | 273/1 E |
| 4,193,600 | 3/1980 | Armstrong et al. | 273/148 R |
| 4,322,612 | 3/1982 | Lange | 364/412 X |
| 4,339,798 | 7/1982 | Hedges et al. | 364/412 |
| 4,373,719 | 2/1983 | Nelson et al. | 273/1 E |
| 4,467,424 | 8/1984 | Hedges et al. | 364/412 |
| 4,760,527 | 7/1988 | Sidley | 364/412 |

FOREIGN PATENT DOCUMENTS

| | | | |
|---|---|---|---|
| 2449631 | 10/1974 | Fed. Rep. of Germany . | |
| 2067080 | 7/1981 | United Kingdom | 273/85 G |

OTHER PUBLICATIONS

Prisament, Steve, "Poker May Get a New Deal" *Venture,* Atlantic City, N.J., Jul. 20, 1984, V1, V3.

Findler, N. V., "Computer Poker", *Scientific American,* vol. 239, No. 1, Jul. 1978, 144–51.

*Primary Examiner*—Robert Weinhardt

*Attorney, Agent, or Firm*—Leitner, Greene & Christensen

[57] ABSTRACT

A data processing system is provided for tallying wealth accumulation among a plurality of competing players. Each player has a game entry device coupled to a central processing unit. The CPU receives data on an interrupt basis from each of the player stations and regulates the ordered play among the competitors. The CPU is responsive to the data for indicating a winner, calculating the accumulated point total or wealth of each of the players and for indicating the amount necessary for a player to risk in order to stay in the competition. Anyone of the player stations designated may perform house or banking functions in addition to player functions.

6 Claims, 16 Drawing Sheets

MULTIPLE PLAYER GAME DATA PROCESSING SYSTEM WITH WAGER ACCOUNTING

This is a continuation of application Ser. No. 616,291 filed Jun. 1, 1984, now abandoned.

BACKGROUND OF THE INVENTION

The invention relates to an multiple player game data processing system with wager accounting for keeping track of holdings, winnings, or accumulated points among a plurality of players. Particularly, in a preferred embodiment, the invention is used as a tallying, game and player sequencing device in a game of poker.

In the game of poker, two or more players receive cards and bet or wager against each other in accordance with known rules. Bets are tracked by use of cash or colored chips, each representing points scored or a denomination of money. A player buys chips from the bank or house and plays with chips as the equivalent of money in making wagers during the game or games. At the end of play, the player cashes the chips for money. The allotment and cashing of chips is time consuming, susceptible to error and inconvenient.

Sometimes during a game, betting errors occur. For example, it is difficult to keep track of which players are in or out of the game and for what wager amount, especially when there are multiple raises. There are also other inconveniences associated with chips or cash. For example, table space is occupied, chips must be stacked after each transaction and chip stacks are sometimes upset and must be re-stacked.

The present invention eliminates the foregoing difficulties and, in addition, adds excitement and a new strategic dimension to the game of poker. For example, the invention displays for all players the pot at stake in a particular game. The wagered amount the raise, and the amount necessary for a player to stay in may be displayed to an individual player upon demand. It also displays which players are in the game, whether a bet exceeds a player's wealth, whose turn it is to be, and the winner at the completion of a hand. The order of betting is strictly enforced, except during the ante phase when random betting and entry is permitted.

In addition, individual players have private access to data indicative of their personal total wealth and their personal stake in each individual on-going game. The game is accellerated for additional excitement because play is not seriously interrupted for the banking tasks and annoying pot and game status inquiries of inattentive players.

SUMMARY OF THE INVENTION

There has provided a multiple player game data processing system with wager accounting for determining respective aggregate points or wealth, gains and losses and the stake of each of a plurality of players wagering against each other in a game of chance. The system includes means for determining an aggregate amount, or pot, wagered by the players, means for determining the amount necessary for a player to enter and remain in the game as initial and successive wagers are made, and means for increasing and decreasing each player's respective aggregate wealth or accumulated points in accordance with the wagers made and the outcome of the game. The system includes a player game entry device or station for each player including respective wealth acknowledgement means for acknowledging and receiving wealth upon demand, wager selector means for registering and indicating an amount wagered and withdrawal selector means for registering withdrawal from the game. Player wealth inquiry means for each respective player station is operative only at such station for selectively indicating a wealth amount for the respective player. A central processing unit is operatively coupled to the player stations for receiving the respective wagers and computing and indicating the pot at stake; for reducing such player's registered wealth in accordance with that player's respective wager; and for comparing the amount of each player's registered wager with a successive higher wager, for calculating the difference therebetween and for registering and indicating an amount necessary for such player to wager in order to remain in the game. Means at the central station is operative to register and indicate a win and the amount thereof in response to the operation of the withdrawal selector means by all of the players but the winner of said game. The wealth selector means communicates with the central station and the winner's player station for increasing the wealth amount of the winner by the pot amount registered by the central station in response to wealth acknowledgement by the winning player.

Means is provided for designating one player station with bank function, and for changing said designation in response to a signal from such station designating another as the bank and an acknowledgement from said station.

DESCRIPTION OF THE PREFERRED EMBODIMENT

Figure 1:
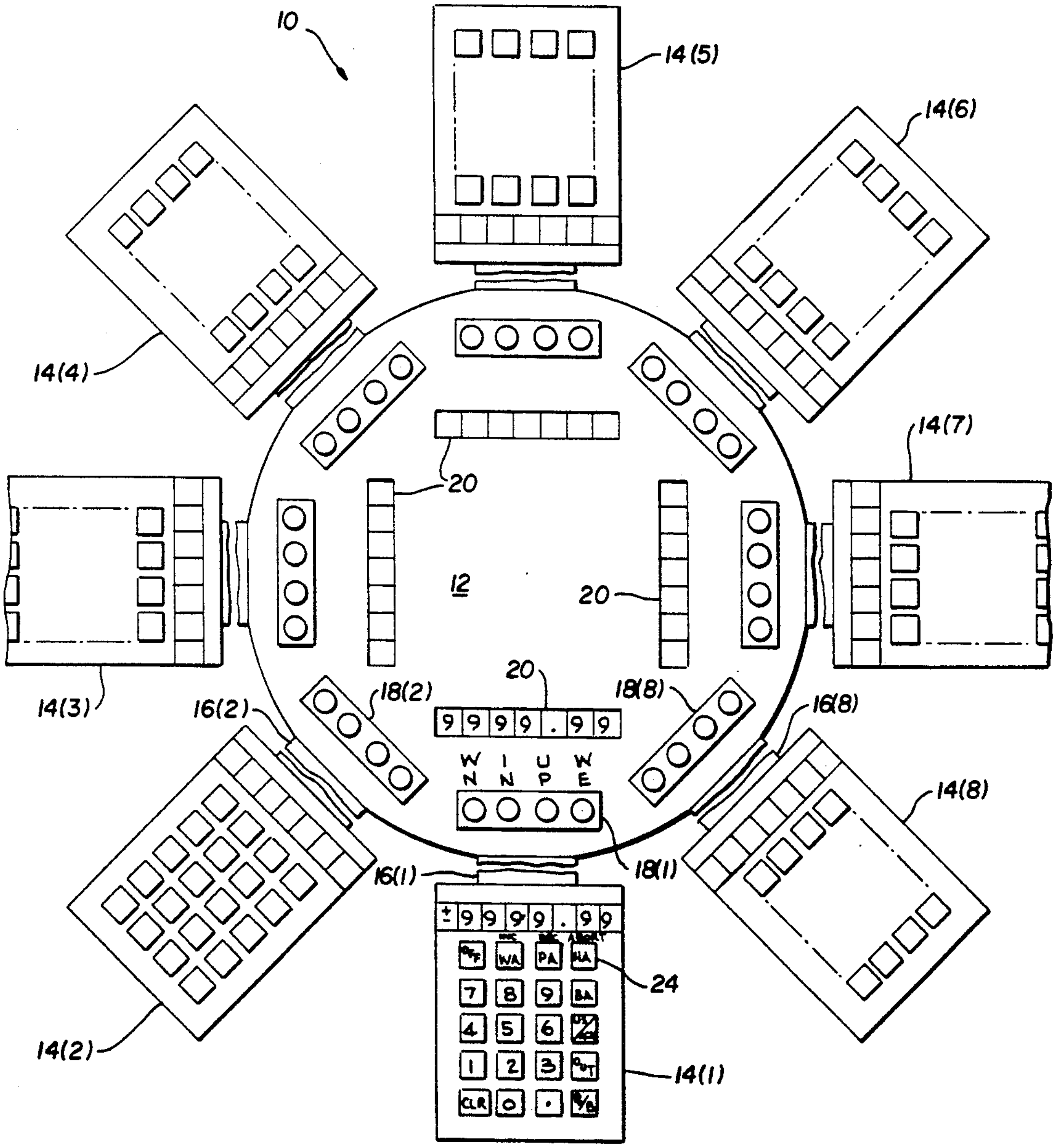
FIG. 1 is a schematic block diagram of the gaming device of the present invention showing eight player stations and a central station.

In FIG. 1 there is shown a gaming device 10 of the present invention. The preferred device 10 is, as hereinbefore described, an electrical system for keeping track of the various aspects of an on-going poker game among a plurality of players. The game comprises a master or central station 12 and a plurality of, preferably eight (8), player stations 14 (1–8) interconnected to the master station 12 over dedicated channels 16 (1-8). Although eight player stations 14 (1-8) are shown, in a preferred embodiment, fewer may be used in a game. Suffixes (1-8) refer to particular player stations and are not used when referring to devices generally.

The master station 12 has a plurality of sets of indicators 18 (1-8), one for each player station 14. Each display 18 is dedicated to give information relevant to a player sitting opposite the same. Each set of indicators 18 includes a plurality of colored lights respectively indicating: WIN (red), IN/OUT (green), PLAYER UP (white), and WEALTH EXCEEDED (amber). In addition, a plurality of digital displays 20 are provided for giving numerical information. The indicators 18 and displays 20 are conveniently located so that each player can see the information conveyed by the master station 12. Although 4 digital displays 20 are shown, more or less may be used if desired because, unlike the indicators 18 (1-8), the digital displays 20 show information common to the game rather than individual players.

Each player station 14 has an alpha numeric keyboard 24 having individual keys 33 for inputting information and functional tasks to the system. The keys 33 are labeled or coded as follows:

| Key Name | Function |
|---|---|
| 0-9 | Numerical inputs |
| (.) | Decimal Points |
| BET/RAISE/WIN ACK and NEW GAME | Bet, raise, win acknowledge and new game |
| OUT | Withdraw from game |
| INC WA | Increase Wealth Account |
| DEC WA | Decrease Wealth Account |
| BA | Display Bet Account |
| PA | Display Personal Account |
| WA | Display Wealth Account |
| HA | Display Hand Account |
| CLEAR | Clear Display |
| ABORT | Exit House/Bank Mode |
| OS/ACK | Initiate Bank move and Acknowledge Bank move |

The function of the keys 33 and corresponding operation of the device 10 shall be hereinafter described in detail in conjunction with a description of the various functional elements of the device.

System Operation

Figure 2:
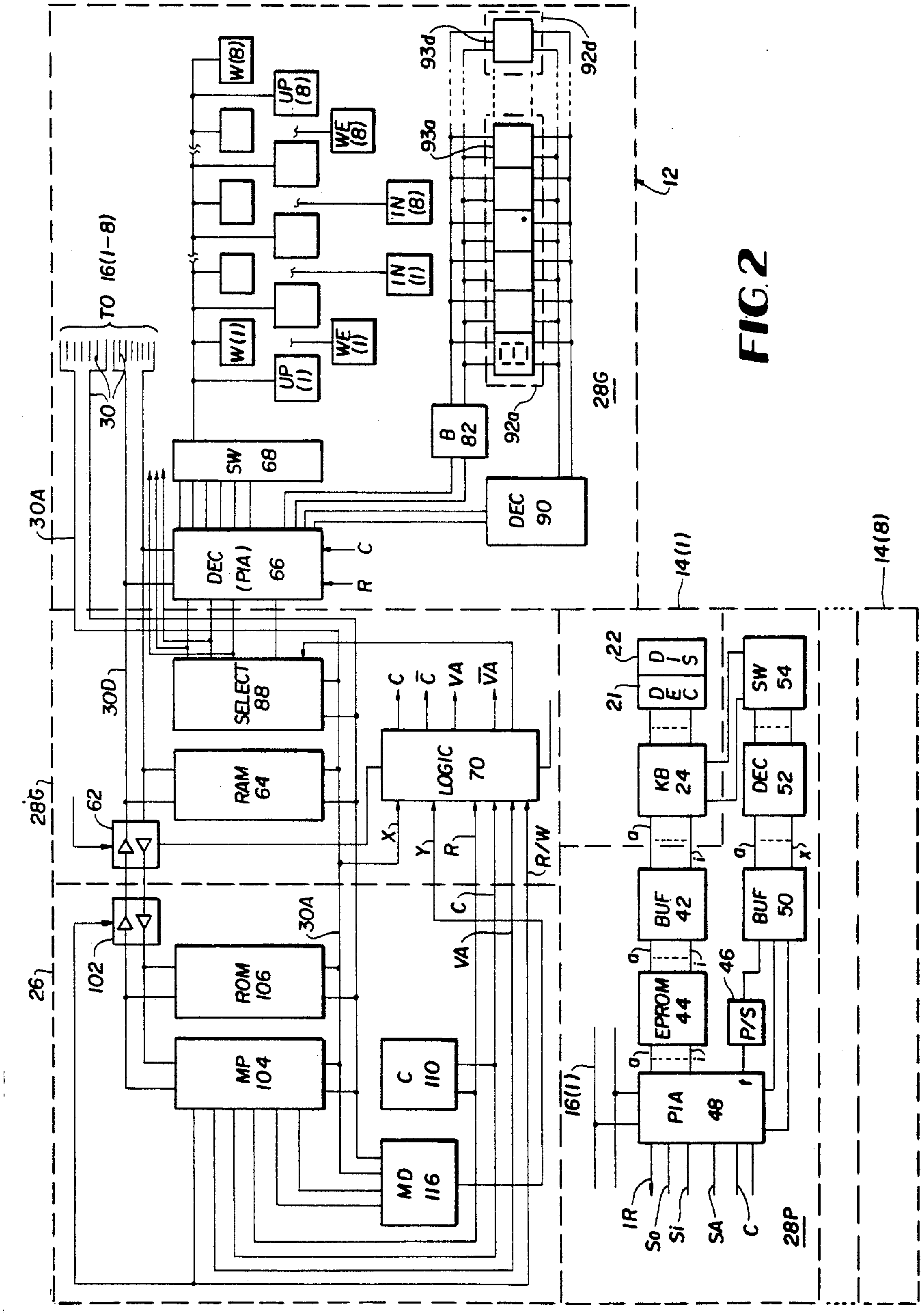
FIG. 2 is a schematic illustration of the layout of the system including a player station, interfaces and a central processing unit.

Referring to FIG. 2, there is shown in block form the central station 12 incorporating therein a central processing unit (CPU) 26 and a general interface 28G. There is also shown in detail one of the eight player stations 14 (1) connected in parallel to the central station 12 over the corresponding channel 16 (1). Each player station 14 has a player station interface 28P which couples the keyboard 24 of the player station 14 with the CPU 26 via the general interface 28G and the respective dedicated channel 16.

In FIG. 2, the CPU 26 is coupled to the general interface 28G over data bus 30D and address bus 30A. Each player station 14 is coupled in parallel to the data bus 30D of the central station general interface 28G via a dedicated channel 16. A station address line SA, hereinafter described, addresses each player station 14 by a dedicated code unique to such station. The CPU thus communicates with each player station 14 individually and exclusively.

Player Station 14

Figure 3A:
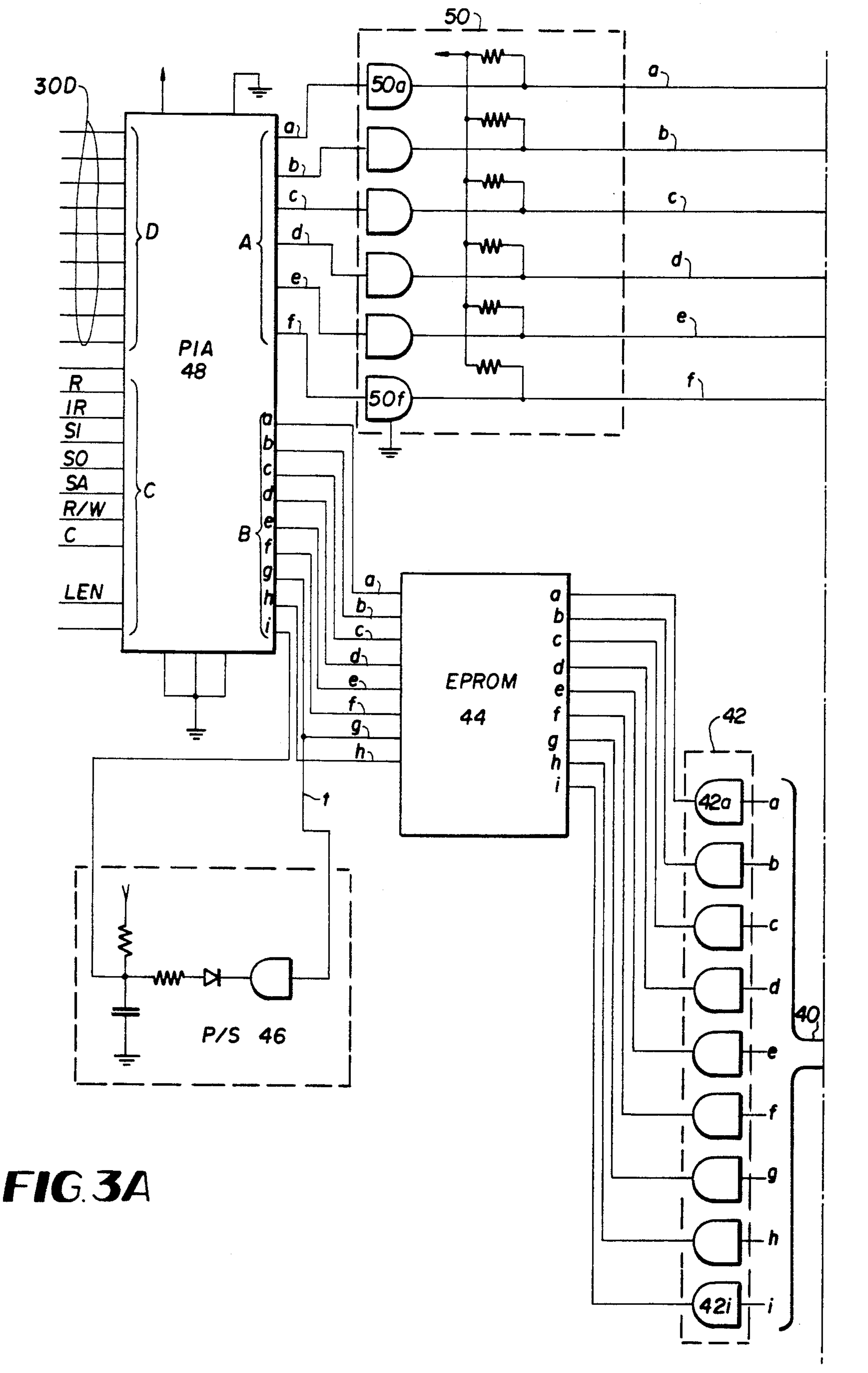
FIG. 3A–3C taken together from left to right make up a schematic diagram of a typical player station.
Figure 3B:
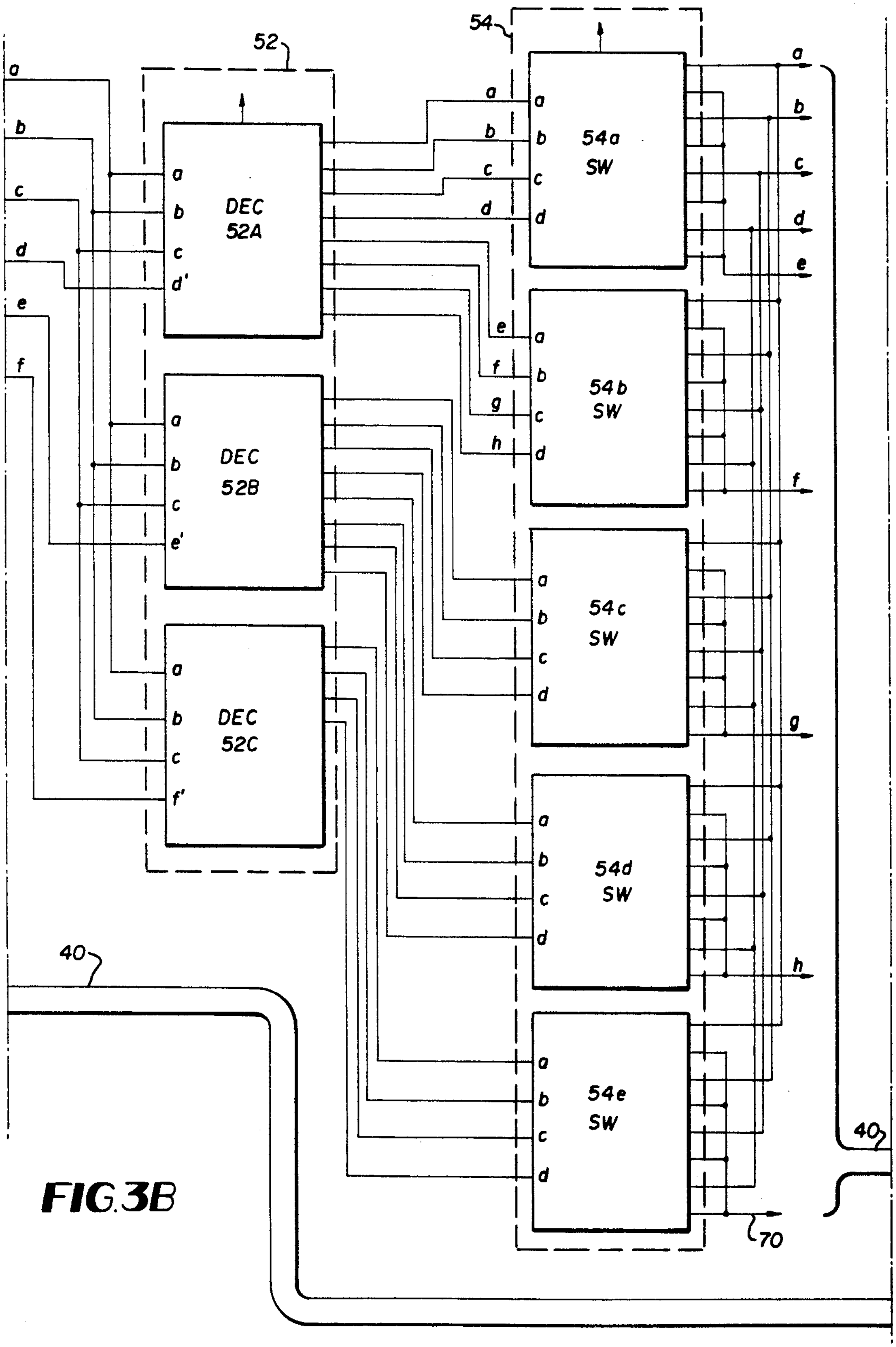
Figure 3C:
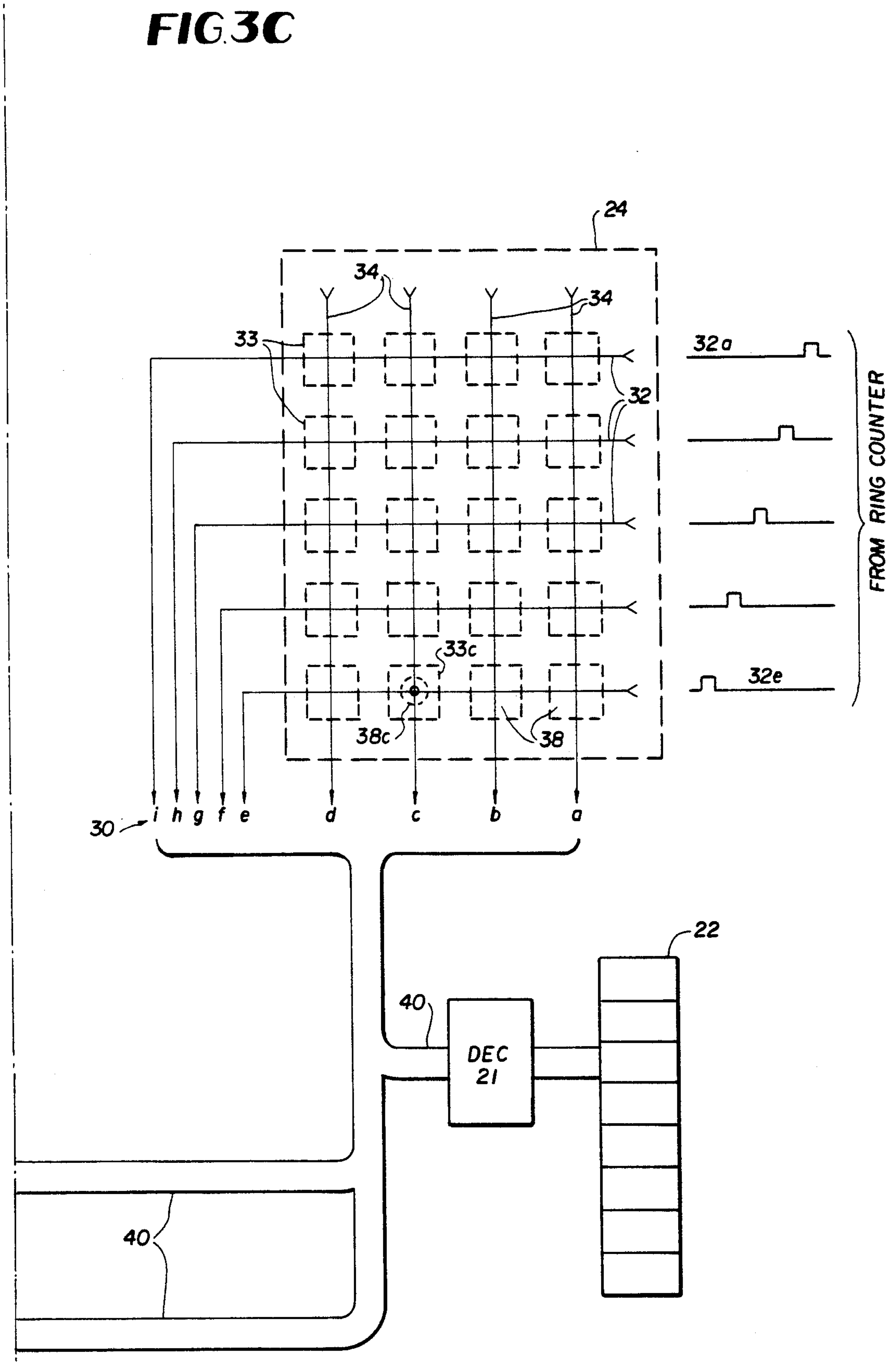

For a description of the player station 14, reference is directed to FIGS. 2 and 3A-C. Each player station 14 comprises a keyboard 24 with decoder 21 and display 22 and a player station interface 28P. One such keyboard 24, with decoder 21 and display 22 is incorporated into a hand-held calculator (not shown) such as Model No. TI-1000 manufactured by Texas Instruments. The device accepts inputs by mechanically shorting a matrix of respective horizontal and vertical wires 32 and 34. In FIG. 3C, such an arrangement is shown. The wires 32 and 34 selectively intersect at normally open contacts 38. Each of said horizontal wires 32 receives phase shifted pulse inputs *32a-32e* from a ring counter (not shown) for sequentially activating the wires in a known manner.

Actuators or keys 33 close the contacts 38 for producing coded outputs along an input/output (I/O) bus 30. Although more or less lines may be used depending on the number of keys and game parameters, in the preferred embodiment, the I/O bus has nine lines *30a-30i*. If, for example, key 33C is actuated, contacts 38C are closed and outputs c and e produce pulsed outputs as high signals *32c* and *32e* while the ring counter is disabled and all other outputs are low. A coded output unique to the closure of said switch *38c* is thus produced. An input/output couples the I/O bus 30 of the keyboard 24 to display 22 via decoder 21. In a preferred embodiment, cable 40 also couples bus 30 to the player station interface 28P, which couples outputs of the keyboard 24 to the master station 12 over the channel 16 and vice versa. It should be understood that a cordless arrangement between player stations 14 and Central Station 12 is possible.

The player station interface 28P is hereinafter described. The I/O bus 30 of the keyboard 24 is coupled via cable 40 to a buffer 42 comprising a plurality of dedicated hex-buffer gates *42a-42i* respectively coupled to the lines *30a-30i* of the I/O bus 30. The buffer 42 steps down signals from the keyboard 24 to an appropriate voltage for the next stage. Each gate *42a-42i* may be a CD 4050 integrated circuit manufactured, for example, by RCA. The buffer 42 is coupled as shown over output lines a-i to an erasable programmable read-only memory (EPROM) 44 which acts as a decoder. The EPROM 44 may be a 2708 integrated circuit manufactured by Intel. The EPROM 44 decodes the signals over the lines a-i therefrom, and produces a coded output over its output lines a-h to a peripheral interface adaptor (PIA) 48, such as 6821 large scale integrated circuit interface manufactured by Motorola. PIA's are known as devices which provide parallel interfacing between some external device according to instructions from a central processing unit. Because the buffer 42 merely steps down the signals from the keyboard, the inputs and outputs are logically the same. The PIA 48 operates as an input/output gating device to the CPU 26 as shown in FIGS. 2 and 5, hereinafter described.

In a preferred embodiment, upon the occurrence of a key stroke, a selected output (g) of the buffer 42 goes low and provides a tag bit for setting a one-shot multivibrator or pulse stretcher 46, which is coupled to a trigger input (i) of the PIA 48. The pulse stretcher 46, including an exemplary gate, diode and RC network shown, maintains the PIA 48 in a receive mode for the inputs a-h of EPROM 44 and causes PIA 48 to produce an interrupt to the CPU 26 as hereinafter described.

Thus, when a key 32 on the keyboard 24 is actuated, selected outputs a–i of the I/O bus 30 are activated, stepped down by the corresponding buffer 42 and decoded by EPROM 44 as inputs to PIA 48. The pulse stretcher 46 produces a gating pulse to PIA 48 which responds by producing an interrupt signal. The pulse stretcher 46 holds the PIA 48 in an interrupt mode for a time sufficient to blank random noise and allow the coded inputs a–h from EPROM 44 to be received by the CPU 26. The CPU 26 recognizes a low going edge of an interrupt. Therefore, unless data on EPROM 44 is accomplished by a key stroke, such data will not be generated on the low going edge of the (g) output of EPROM 44, which is coupled to input (i) of PIA 48 via the pulse stretcher 46. Thus, if (g) goes low, another signal from the particular player station cannot generate an interrupt until the pulse shutter times out. Thereafter, data gated by the PIA 48 is transmitted to CPU over data bus 30D.

As hereinbefore mentioned, the PIA 48 is an interface device providing parallel data to CPU 26. Data output from the CPU may be gated to the player station 14 by means of other circuits in the player station interface 28P hereinafter described. Such data includes wealth information, the player's personal account or stake in the game, the bet required to stay in the game, etc.

It should also be understood that when CPU outputs data, an input interrupt will occur. During such time, the CPU recognizes and processes the input data from the station receiving output, but discards the data so obtained from that station upon completion of the output sequence. The falling edge of the signal generated by the pulse stretcher 46 generates the interrupt. However, during output the interrupt is masked. The system does not recognize the interrupt generated by the station while receiving the output.

The PIA 48 has outputs a–f which are coupled to a buffer 50 having step-up gates 50*a*–50*f*, such as 7407 integrated circuits manufactured by National Semiconductor. The buffer 50 has outputs a–f coupled to a decoder 52 (FIG. 3B). The decoder 52 includes three decoders 52*a*–52*c* such as CD4028 integrated circuits manufactured by RCA and sometimes referred to as "one of eight" decoders. The decoders 52*a*–52*c* receive selected outputs a–f of the buffer 50. For example, each decoder 52*a*–52*c* receives outputs a–c of the buffer 50 at its corresponding input a–c. Further, each decoder 52*a*–52*c* respectively receives one each of the remaining outputs d–f of the buffer 50 at a respective corresponding input d', e' and f'. Therefore, the outputs a–c of buffer 50 provide coded data, and the outputs d–f, when energized, select one of the decoders 52*a*–52*c* to receive such data. For example, when output f of the buffer 50 is high or on, outputs d and e are low. Thus, only decoder 52*c* receives an input f' enabling it to receive the data from the outputs a–c. Likewise, when output e of the buffer 50 is high, the d and f outputs are low, and only decoder 52*b* receives an input e' to render it active.

The decoder 52 is coupled to a switching device 54, which preferably includes analog switches 54*a*–54*e* such as CD4016 analog switch devices 54*a*–54*e* manufactured by RCA. Each switch 54*a*–54*e* closes or short circuits selected outputs a–h thereof in response to coded inputs from the decoder 52. In the drawing, it can be seen that the decoder 52*a* has outputs a–d coupled to corresponding inputs a–d of the analog switch 54*a*. The remaining outputs e–h of decoder 52*a* are coupled to inputs a–d of analog switch 54*b*. Likewise, decoder 52*b* has half of its inputs a–d coupled to the analog switch 54*d*. Finally, decoder 52*c* has four outputs coupled to the analog switch 54*e*. Other outputs of the decoder 52*c* (not shown) are spares and not used in this particular circuit. It should be understood that while an output to display 22 is occuring, the system software does not permit or recognize an input from the particular player station. Thus, a conflict of signals is avoided.

Outputs from the decoders 52 actuate inputs to the various analog switch devices 54*a*–54*e* for selectively closing or short circuiting selected outputs thereof. For example, the decoder 52*a*, when energized by actuation of its d' input as hereinbefore described, transmits the coded data from the inputs a–c for driving selected ones of its outputs a–h to an "on" condition. It should be noted that alternate outputs a, c, e and g of the switch 54*a* are coupled to the I/O bus 30 of the keyboard 24 as leads a, b, c and d over wire 40. Outputs b, d, f, and h are joined together along a common lead to the I/O bus 30 as lead e. Likewise, the switch 54*b* is similarly arranged so that leads a, c, e and g are coupled in parallel as leads a, b, c and d of I/O bus 30. Common leads b, d, f, and h are coupled to lead f of I/O bus 30. Switches 54*c*–*e* are likewise coupled in parallel with I/O bus 30, but with respective common leads g, h and i coupled to I/O bus 30 as shown. If the output c of the decoder 52*a* is driven high, outputs e–f of the analog switch 54*a* become short circuited by internal circuitry thereof. Thus, when the outputs e–f of switch 54*a* are closed, wires c and e of the I/O bus 30 are shorted. This is analogous to the closure of a switch 33C at intersection 38C'. When corresponding horizontal and vertical wires 32 and 34 of keyboard 24 are closed at 38C' by switch 54*a*, it is as if switch 33C had been manually closed. The player station 14 therefore responds by providing a digital output to decoder 21 driving display 22, as hereinbefore described. In 54*a*–54*e* have corresponding outputs which are coupled in parallel with the respective normally open contacts 38 of the matrix hereinbefore described.

The player station interface 28P thus provides input data to the central station 12 from the keyboard 24, which input data is simultaneously decoded at 21 and displayed on the player statio display 22 by virtue of the closure of the selected normally open contacts 38. Likewise, the player station interface 28P couples data transmitted from the central station 12 to the corresponding player station 14 by closing selected switches in parallel with the normally open contacts 38 of the keyboard 24 for decoding at 21 and display on the player station display 22.

The PIA 48, hereinbefore described, performs other functions as well as the routing of input and output data between the player station 14 and the central station 12. The operation and programming of the 6821 is explained in detail in the 6821 manual. In a preferred embodiment, port A is programmed as an output port. Port B is an input port that has been conditioned to accept an interrupt as hereinbefore defined. Data port D accepts and transmits Data, and control port C accepts or transmits control functions by interrupt IR, read/write R/W, Reset R, Clock C, Enable EN, and station address or selection data SO, SI and SA.

The PIA 48 gates data from the CPU 26 over data bus 30D only when it is properly addressed. This occurs when a station address (SA) lead is actuated at control port C. Similarly, PIA is operative for communicating data at data port D to and from the CPU 26 over data bus 30D when conditioned by the CPU 26. Selection of such an input or output mode of the PIA 48 is accomplished by selecting or addressing the on condition of respective input SI or output SO register selects of PIA 48. Similarly, the CPU is conditioned to read or write data only if the read/write R/W input of the PIA is properly conditioned.

In connection with the foregoing, the present invention utilizes a memory mapped system. Upon initialization of the system, codes generated in CPU 26 produce coded inputs to each PIA 48 (1-8) unique thereto. The codes condition the PIAs 48 (1-8) such that selected terminals act as inputs or outputs etc. This system software handles input output functions of the PIAs 48 (1-8). In other words, the PIAs 48 (1-8) are programmed on initialization to act in the manner desired (for example addressing input and output register selects SI and SO), such that, it is only necessary to call on a particular PIA and its output port A or input port B acts accordingly. Other systems are possible for selecting input and output function, and the like. However, the memory mapped software of the present invention has been found to be a preferred and efficient system for accomplishing the task.

When the particular player station 14-1 has been addressed by Station Address (SA) and R/W is in write or low, PIA 48 transmits data from the CPU 26 to the display 22 over the buffer 50, decoder 52, and switch 54 as hereinbefore described. When PIA 48 is addressed in a read mode, the R/W input is in a state opposite from above. Input data produced as a result of closure of certain ones of the normally open contacts 38 (resulting from mechanical key strokes) is transmitted to the CPU 26 by PIA via buffer 42 and EPROM 44 as hereinbefore described.

PIA 48 has a clock input (C), which is produced by a clock (hereinafter described) at the central station 12. The clock produces pulses which hold the PIA 48 in synchronism with all the other player stations 14 (1-8) and the central station 12.

The PIA 48 has an interrupt output IR coupled to the central station 12 over the channel 16. The IR output is actuated or goes low whenever the tag bit (t) produced by EPROM 44 drives the pulse stretcher 46 on, thereby holding input i of the PIA 48 on as hereinbefore described. The interrupt IR communicates a pulse to the central station 12 indicating that data is available from the keyboard 24 for interpretation by the central station 12.

The PIA 48 may be reset to an initial condition by means of the reset input R as shown. When the system is initially turned on, a reset pulse is coupled to the PIAs 48 (1-8) for enabling the circuits and registers of the PIAs to receive the coded signals from the CPU 26 whereby the portsof PIAs 48 are mapped or conditioned to act as inputs and outputs.

Master Station 12

For a description of the master or central station 12 reference is directed to FIGS. 2, 4A-4C and 5A-5B. The master station 12 includes the CPU 26 and general interface 28G. Each player station interface 28P is coupled in parallel with general interface 28G over its respective channel 16 including data bus 30D Each player station 14 (1-8) is operative for communicating with the master station 12 to the exclusion of all the other player stations 14 by means of an interrupt function of the CPU, which processes one interrupt at a time. CPU 26 recognizes the station by selective actuation of the respective Station Address (SA) for the particular player station 14 and testing the polled station for the presence of a valid address code.

In a preferred embodiment, the CPU 26 processes data and produces outputs to the player stations 14 (1-8), the master displays 20 and indicator lights 8 (1-8). In the event of a key stroke produced at any play station, the CPU 26 completes the program instruction (i.e. line) at hand and recognizes the interrupt The CPU 26 polls the stations 14 one by one and takes in data from the interrupting station. Thereafter the CPU 26 resumes the program function. The data received from the player station is later processed in accordance with the system software.

The general interface 28G includes inverting bidirectional driver 62 including two DM 8835 integrated circuits 62W, 62R manufactured by National Semiconductor. The drive 62 is coupled into the CPU 26 data bus 30D.

Communication between the CPU 26 and player stations 14 (1-8) is accomplished by means of selectively addressing each of the player stations 14 (1-8) separately over select address line SA (1-8). Address bus 30A is coupled to the general interface 28G as shown. The address bus 30A is coupled to the channels 16 (1-8) carrying respective select address lines SA (1-8) dedicated to respective player stations 14 (1-8).

The general interface 28G includes a random access memory (RAM) 64, addressed as shown by address lines A0-A8. RAM 64 includes three RAM devices 64A-64C (shown in FIG. 4 and sometimes referred to as chips) or integrated circuits such as 6810 devices manufactured by Motorola. The RAM 64 is capable of holding at least 384 bytes of eight bit data (128 in each RAM 64A-64C) information and may be used to store values to be displayed, temporary results of arithmetic routines, system control, variable accounts, game statistics, etc.

The read/write (R/W) input to each RAM 64A-64C selectively enables each to operate in either a read or write mode in correspondence with the read or write mode of the CPU 26. Thus, in accordance with instructions established in the computer program, the RAM 64 contains or stores non-conflicting input and output data for each player station 14 (1-8) and the central station 12.

The clock line C operates the RAM 64 in synchronism with all other devices in the apparatus. A valid address VA line carries a signal that verifies that the information on address bus 30A is in fact a valid address.

In the preferred embodiment, the CPU 26 respectively reads and writes information to and from the various player stations 14 (1-8). In addition, the CPU 26 provides visual indication in the central station 12 of the information common to all the players by means of the digital display 20 and the particular information relevant to a player station 14 associated with a set of indicator lights 18 as hereinbefore noted.

The RAM 64 is coupled to the CPU 26 via the address bus 30A and the data bus 30D. The RAM 64 is a read/write device, that is, information stored in the RAM is readily accessible by the CPU 26 acting in a read mode, and the CPU 26 can change that information at a selected address in the RAM 64 when acting in a write mode. When properly addressed on the address bus 30A, the RAM 64 produces an output on the data bus 30D which is coupled to the CPU 26. Other portions of the system, including the indicators 18, displays 20 and player stations 14, are not responsive to data on the data bus 30D unless they have been preconditioned to be responsive thereto. In other words, if the RAM 64 has been initialized to communicate with the CPU 26, other portions of the system are simultaneously initialized not to be responsive to the RAM 64. If it is necessary to change RAM 64 in any way, the address bus 30A is selectively actuated to reach the proper address in RAM 64, and data is transmitted from the CPU 26 over the data bus 30D to the input of the RAM 64.

The CPU 26 communicates with the player stations 14 (1-8) and vice-versa. The RAM 64 and the player stations 14 (1-8) do not directly communicate with each other. When communication is open between the RAM 64 and the CPU 26, communication is closed between the player stations 14 and the CPU 26.

The CPU 26 controls the indicators 18 and displays 20 in the central station 12 by means of a peripheral interface adaptor (PIA) 66. The PIA 66 includes three peripheral interface adaptors 66A, 66B and 66C such as 6821 integrated circuits manufactured by Motorola. Each PIA 66 receives coded data from CPU 26 over data bus 30D representing information commonly available to all players in the game, e.g., Win, In/Out, Wealth Exceeded, Player Up, and Pot Value Information. A selector 88, coupled to PIA 66, enables it to operate selected outputs for actuating indicators 18 and displays 20.

The PIA s 66A-66C are coupled to the data bus 30D as shown. The PIA s 66A and 66B are selectively enabled to be responsive to the data on the data bus 30D for providing input to indicators 18. The data is communicated from the PIA s 66A and 66B to a solid state switching device 68 which includes a plurality of solid state switches 68a-68h, such as Sprague UD4181 power drive integrated circuits. The switching device 68 selectively enables certain ones of the lights: Win, 18W (1-8), Player Up 18P (1-8), Wealth Exceeded 18WE (1-8), and Player In 18M (1-8), depending on the game condition and the status of the player in question.

In a preferred embodiment, all of the outputs of the PIA's 66A-66B are in a high or activated state. Coded information from the CPU 26 causes one or more of the outputs of the PIA s 66A and 66B to become low for causing the selected switches 68a-68h to drive one or more of the indicator lights 18 on.

The PIA 66C is dedicated to be responsive to the data from the CPU for driving selected inputs of the digital display 20 to an on condition thereby creating an alpha numeric display of information relevant to the game. The PIA 66C has one set of outputs a-h coupled to booster 82, including a pair of booster circuits 82*a* and 82*b*, such as integrated circuits 7437, manufactured by National Semiconductor.

The booster 82 raises the level of the outputs a-h of the PIA 66 to an appropriate level for driving displays, hereinafter described. Outputs i, j and k of the PIA 66C are not amplified.

The booster 82 outputs f-h and PIA 66C outputs i, j and k are coupled to decoder 90. The decoder 90 includes three one of eight decoders 90*a*, 90*b* and 90*c*, such as 7442 integrated circuits manufactured by National Semiconductor. The one of eight decoders 90*a*-90*c* cooperate as the decoder 52 in the player stations as described above.

Outputs a-e of the booster 82 are coupled via respective pot display connectors 92*a*-92*d* to pot displays 93*a*-93*d* such as HP 5082-7300 manufactured by Hewlett-Packard. The pot displays 93*a*-93*d* each include six display windows 94*a*-94*f* each of which receives and decodes the inputs a-e for producing alpha numeric displays in each of the windows 94*a*-94*f* of the displays 93*a*-93*c*.

Outputs i-k of the PIA 66C are coupled to strobe inputs i'-k' of the decoder 90. As a coded input from decoder 82 appears on the lines a-e of each window 94*a*-94*f* of the pot displays 93, the strobe inputs i'-k' cause its respective decoder 90*a*-90*c* to strobe selected outputs a-x in succession. Thus, the windows 94*a*-94*f* of each pot display 93*a*-93*d* are selectively activated with a numerical symbol representing data from the central processing unit 26.

A selector 88, such as a 74S138 one of eight decoder manufactured by National Semiconductor, on the general interface 28G has inputs a-c and an inverted VA input. The inputs a-c provide eight combinations of binary logic for controlling the selector 88. Respective outputs a-h of the selector 88 are coupled to PIA's 66 respective select address inputs SA (1-3) and SA (1-8) of the player stations 14 (1-8). When a VA signal coupled to enable selec 88 is present and outputs are available on the lines a-h of the selector 88, one or two of the PIAs 48 or PIAs 66 is selected for communication with the central station over its respective select address lines SA (1-3) or SA (1-8). Thus, means is provided for selectively utilizing the selector 88 as a decoding device for each of the player stations 14 as well as a decoding device for selectively operating the various indicators 18 and displays 20.

Figure 4A:
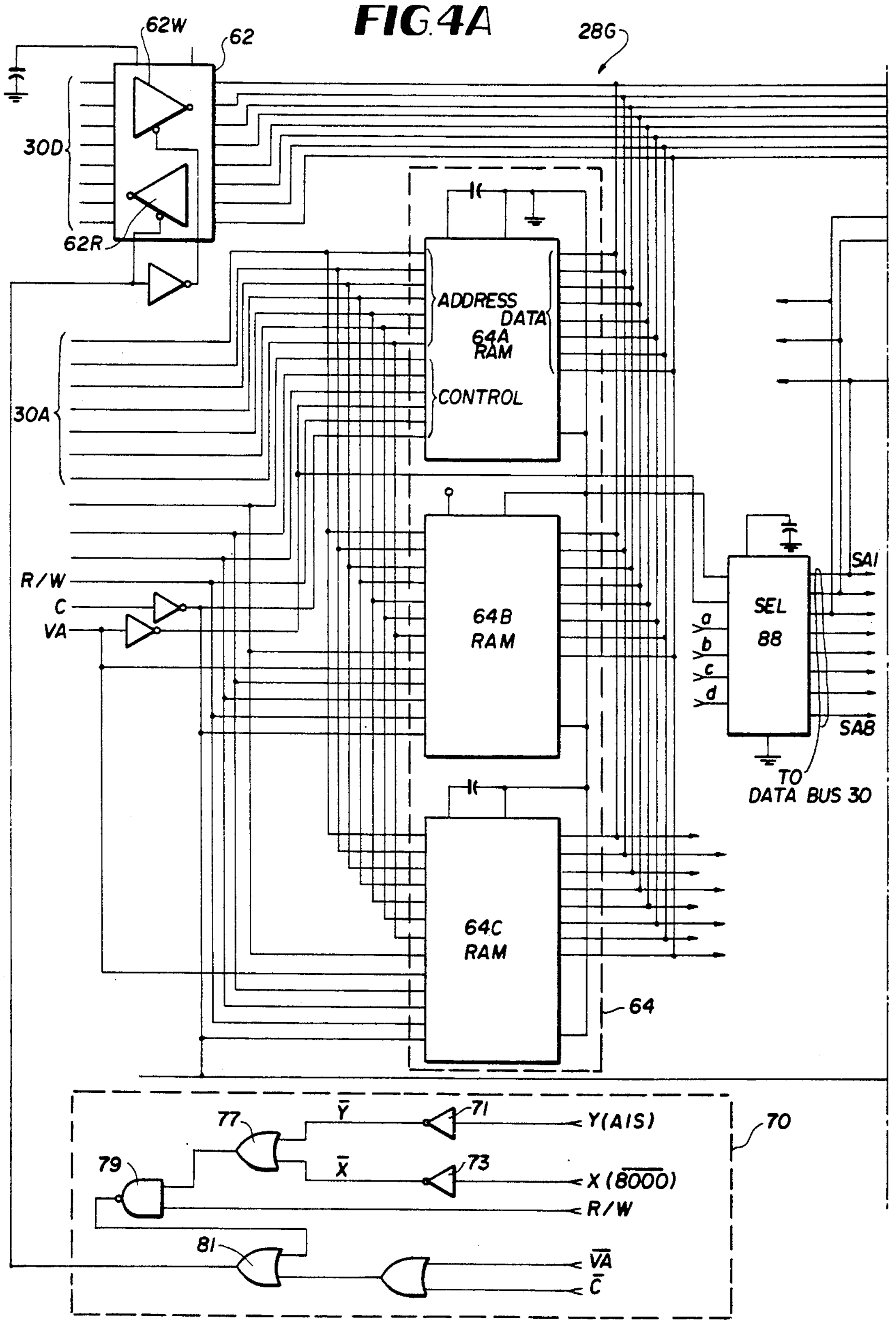
FIGS. 4A–4C taken together from left to right make up a schematic diagram of an interface between each of the player stations and the central processing unit showing inputs and outputs, along with system RAM and lamp and display drives.
Figure 4B:
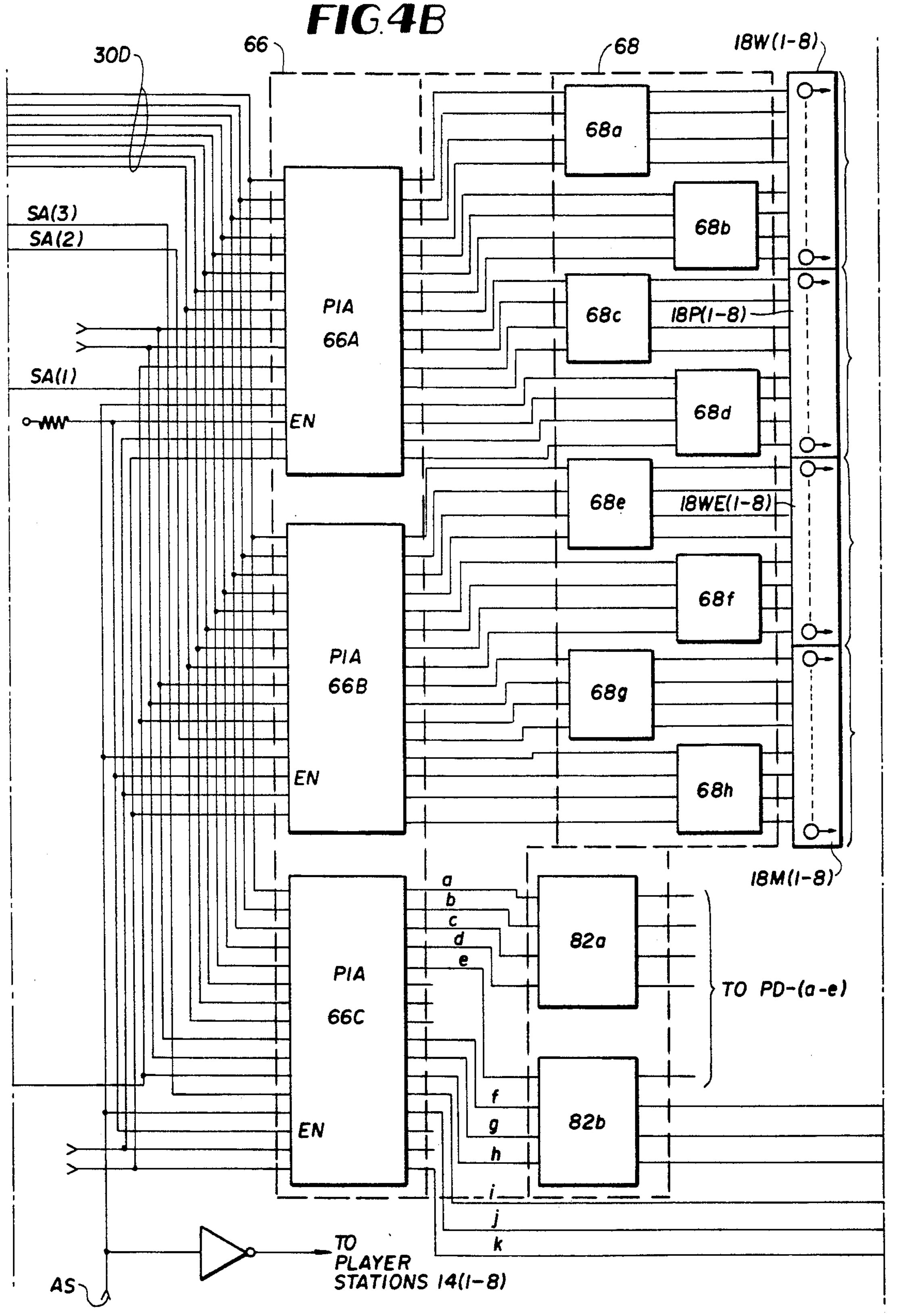
Figure 4C:
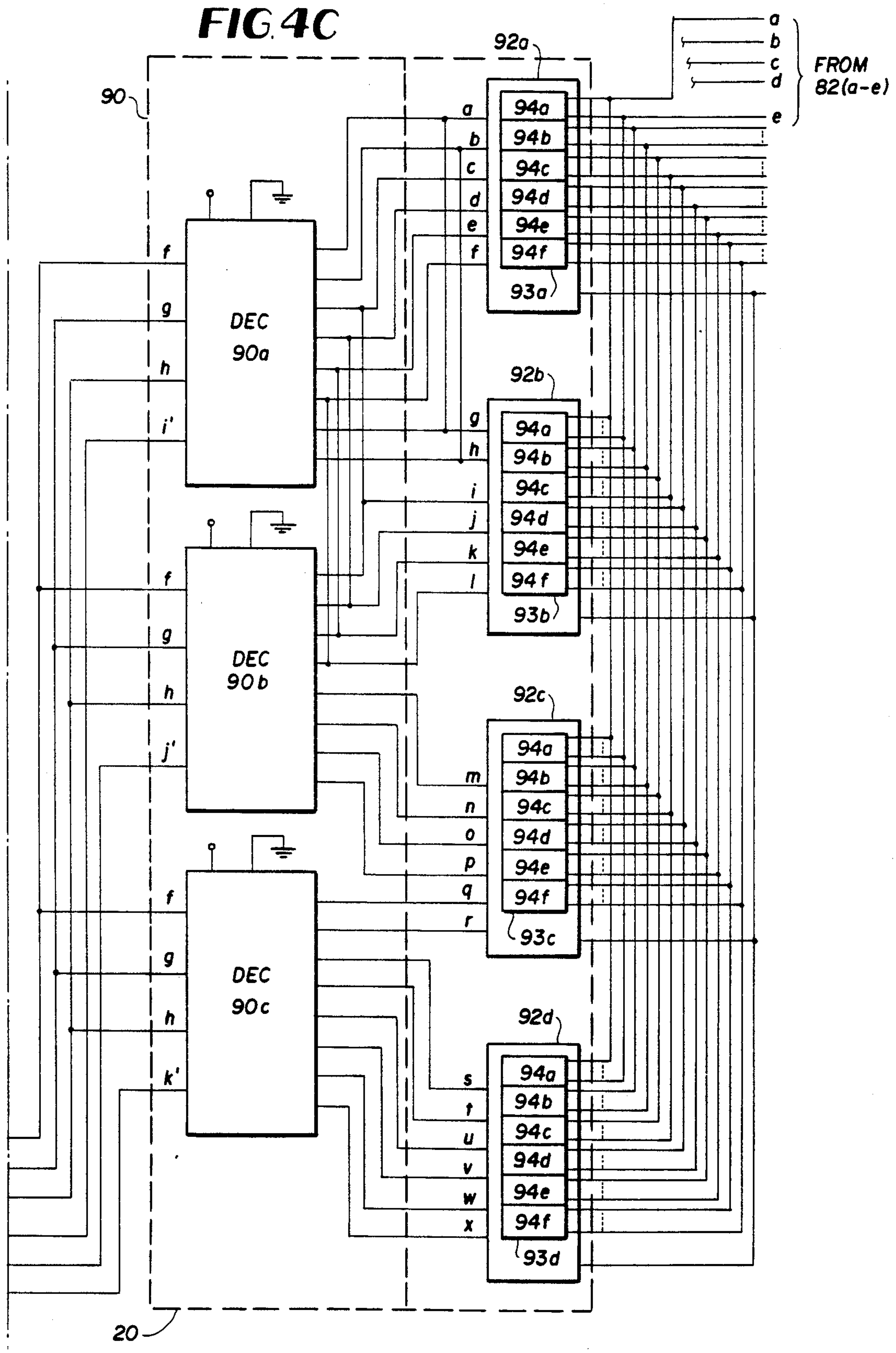

Address bit A5 shown in FIG. 4B is provided for assuring that the outputs a, b, and c of the selector 88 are not confused with the outputs a-h of the same selector when in communication with the player stations 14 (1-8). This occurs as follows: a tag bit provided by the address bus 30A at line A5 is coupled to enabling inputs EN of the PIA's 66A-66C. The tag bit A5 is coupled to similar enabling inputs EN on each of the PIA's 48 for the player stations 14. However, the bit A5 is inverted (See FIG. 4B) between the general interface 28G and the player stations 14 so that when A5 is present, PIAs 66A-66C are enabled and the player station PIAs 48 (1-8) are disabled, and the absent A5 is converted into an enable signal for enabling the of the various player stations 14 (1-8). Thus, the 88 operates for selecting the various PIA's 66 and 48 only when a selected enable signal is available from the CPU 26, and the use of address bit A5 differentiates between the local indicators at the general interface 28G and the remote indicators at each of the player stations 14.

In FIGS. 2 and 4A, signals from memory decoder 116 and address bus 30A are coupled to inputs of logic 70. In the preferred embodiment, a signal A15 corresponding to the addresses not allocated to the PIAs and a signal corresponding to the addresses not allocated to RAM (8000) are used. These signals are inverted by invertors 71 and 73 respectively and then OR'd by OR gate 77 to produce a signal that is in a high state when either a PIA or RAM is addressed by the CPU. The output of OR gate 77 is used as an input to enable NAND gate 79, while the other input to NAND gate 79 is the R/W signal. The output of NAND gate 79 will then be in the low state only when the CPU is in the READ mode and either a PIA or RAM is being addressed. Signals $\overline{VA}$ and $\overline{C}$ are OR'd by OR gate 83 to produce a signal which is in the low state only when the clock and valid address lines are in the high or true state. The output of OR gate 83 and NAND gate 79 are inputs to OR gate 81. OR gate 81 therefore is in a low state only when the CPU is in a valid READ mode involving either a PIA or RAM. Otherwise, OR gate 81 is in a high state.

The output of OR gate 81 is applied to the input of 62I and the read-enable-on-low input of bidirectional devices 62R–62W. The output of gate 62I is applied to the write-enable-in-low input of 62. When the CPU is reading from a RAM or PIA, the output of OR gate 81 is low and therefore driver 62 is in the READ mode. When any other section of memory is addressed, a write operation is occurring, or an invalid memory location, the driver 62 is in a write mode. This prevents invalid data from the general interface from interferring with data on the CPU bus, i.e. cross-talk. Note that a corresponding bi-directional driver 102 operates in a similar manner under CPU control so that signal direction is maintained.

Central Processing Unit 26

The central processing unit CPU 26 is described hereinafter with respect to FIGS. 2 and 5A–5B.

CPU 26 is coupled to the general interface 28G described hereinbefore over the data bus 30D and the address bu s 30A, which is a subset of the address bus of the CPU. Data output from the CPU 26 is coupled to the data bus 30D through a bi-directional inverting driver 102 which may be an 8835 integrated circuit similar to the bi-directional driver 62 hereinbefore described. The data output of the CPU is thus inverted. Double inversion by the drivers 62 and 102 assures compatable polarity of the data signals from the CPU 26 and the general interface 28G.

The CPU includes a micro-processor 104, which may be a 6800 integrated circuit manufactured by Motorola. The micro-processor 104 communicates with the data bus 30D as shown. Similarly, the micro-processor 104 communicates over the address bus 30A via a driver 108 which may be a DM 8097 manufactured by National Semiconductor. A read only memory ROM 106 includes a plurality of ROM circuits **106*a*–106*d*, such as 2708 EPROMs manufactured by Intel. The ROM 106 is loaded with the program for operating the game in accordance with the flow charts hereinafter described. The CPU 104 addresses the ROM over the address bus 30A for accessing information relative to the game program, which information is coupled to the micro-processor 104 over the data bus 30D. A decoder 116 is responsive to certain address lines on the address bus 30A for producing outputs indicative of the particular memory segments addressed by the micro-processor 104, one example of which has been described with respect to logic 70. Outputs of the decoder 116 are utilized for logically gating other portions of the system hereinafter described. A clock 110 is coupled to the micro-processor 104 and to other portions of the system over the clock lead C as hereinbefore noted. The clock 110** produces pulses for driving the system in synchronism.

As with most computer operated systems, the computer or micro-processor 104 shares its time among various portions of the system. Accordingly, means is provided for selectively gating the micro-processor 104 so that it selectively communicates with various portions of the system without contention. Further, the peripheral devices coupled to the micro-processor 104 produce signals which are selectively received or blanked in accordance with means for sorting or keeping track of the various signals. Accordingly, selected outputs of the micro-processor 104 are logically coupled to various peripheral devices, hereinbefore described, for selectively actuating certain ones and deactuating others in accordance with the operation of the system.

The operating system of the 6800 micro-processor is described in a 1978 publication of Motorola, Inc., entitled M6800 Micro Computer System Design, Data, 2nd printing, which publication is incorporated herein by reference. The control signals and operating system of the present invention are comparable with the micro-processor described in said publication.

The micro-processor 104 is operative for communicating with the selected player stations 14 (1–8) for transmitting information to such stations. Similarly, the micro-processor 104 is conditioned for receiving information from the player stations 14 (1–8) in response to interrupts and other signals necessary for such communication. The micro-processor 104 communicates in accordance with its interpretation of the instructions stored in its ROM 106.

Figure 5A:
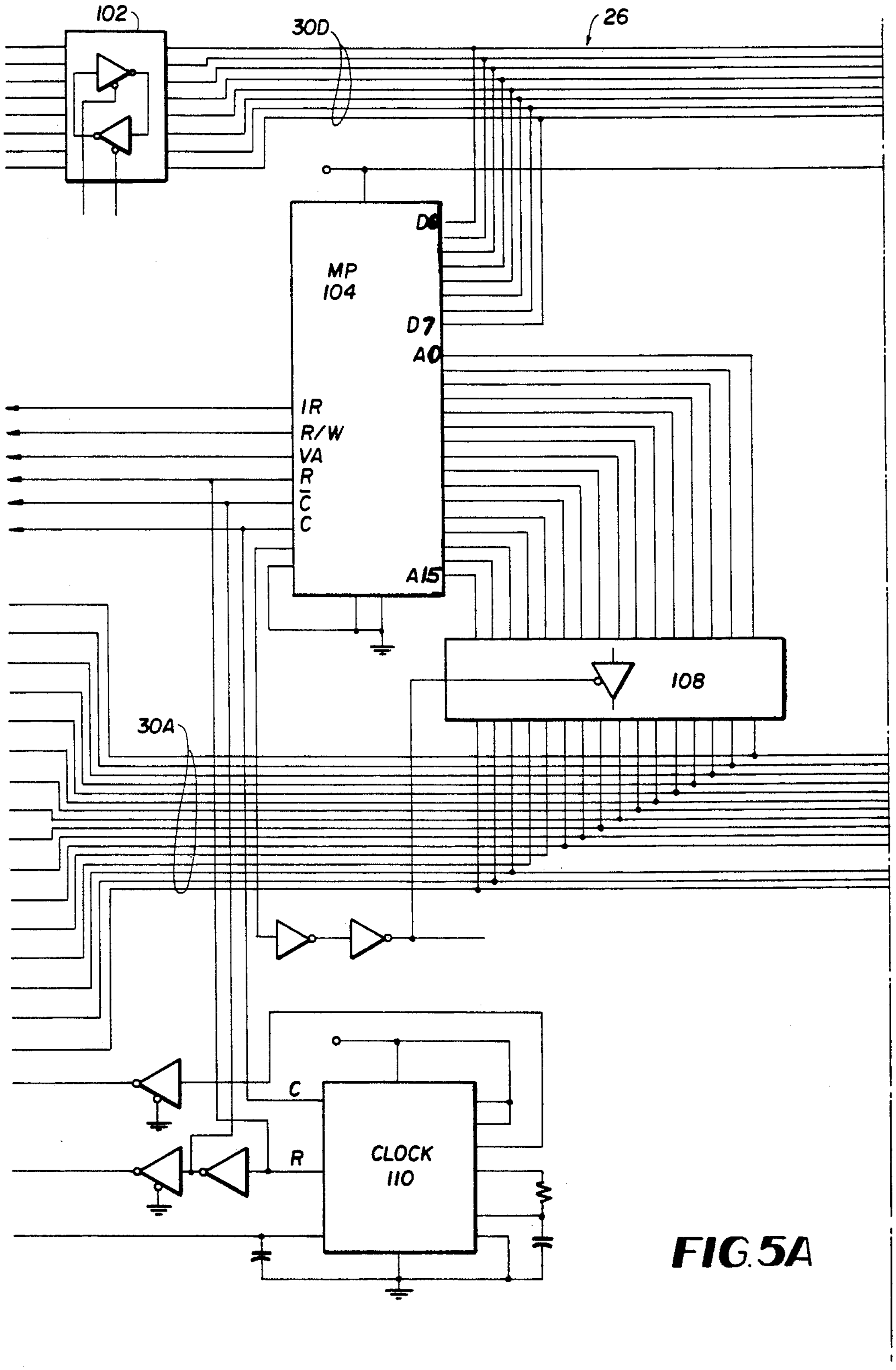
FIGS. 5A–5B taken together from left to right make up an electrical schematic of the central processing unit with inputs and outputs.
Figure 5B:
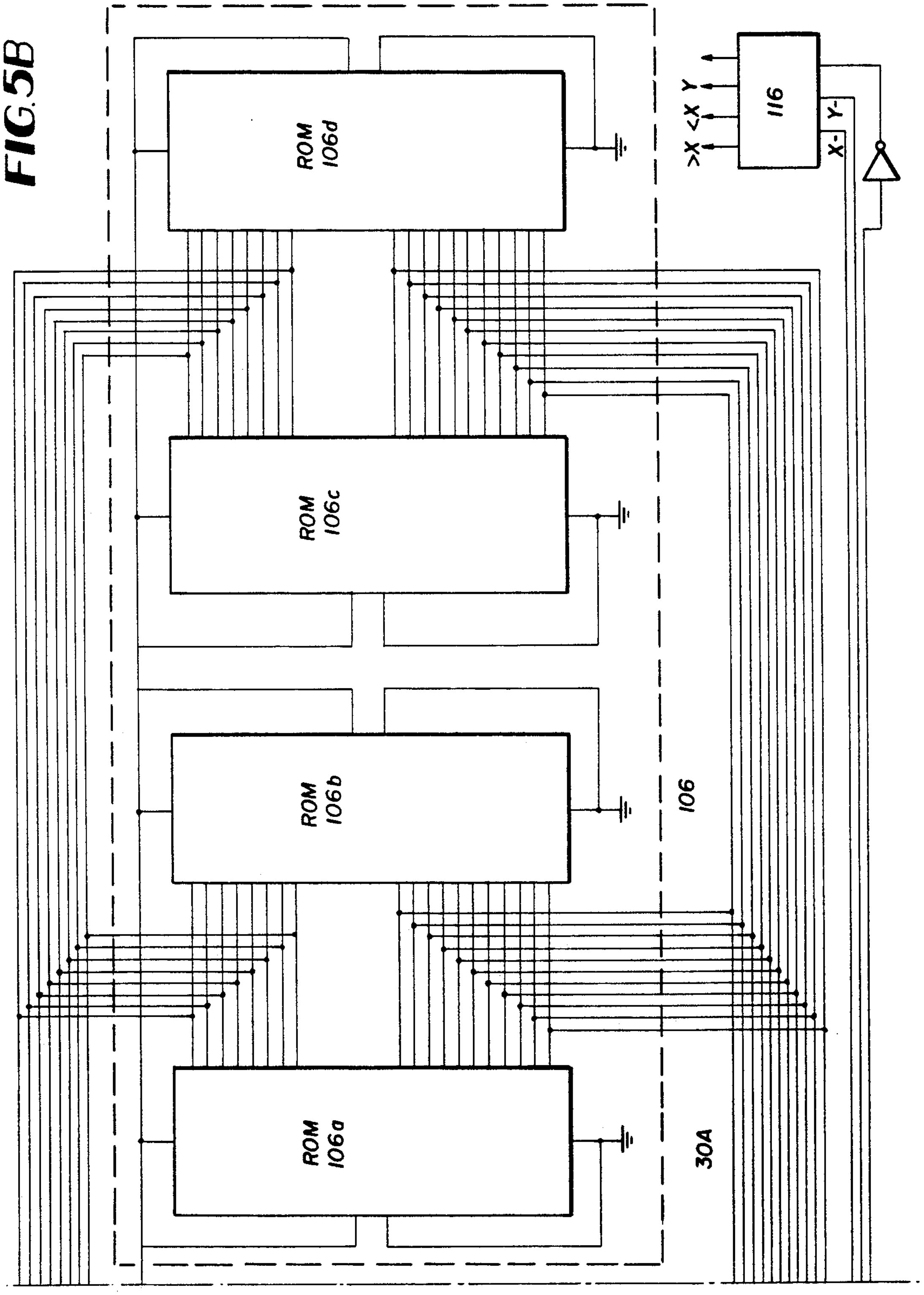

In FIGS. 5A–5B, various individual circuits of the CPU 26 are illustrated in detail. Micro-processor 104 has certain inputs and outputs including the interrupt IR, read write R/W, valid address VA, reset R, clock C, data lines DO–D7 and address lines A0–A15.

Interrupts IR are communicated to the micro-processor 104 by each of the player stations 14 (1–8) and as described above.

The CPU generates read/write R/W pulses for selectively enabling and disabling devices in communication with the CPU in accordance with the operating systems of the micro-processor. For example, the micro-processor 104 reads the program from ROM 106. The micro-processor 104 reads and writes to the RAM 64 in the general interface 28G by means of read write line R/W.

The clock produces clock pulses for driving the micro-processor 104 and other devices hereinbefore described in synchronism. The clock 110 may also produce other time signals as necessary. The clock 110 also produces a reset upon actuation of the system during the power up or initialization phase of the system operation. Initialization occurs in accordance with ordered instructions in software. Instruction manuals of the various IC's describe initialization requirements which need not be described here.

GAME PLAY

The actual use of the invention involves following a procedure not unlike the normal play in a game of poker. Each player, by means of the keyboard, is able to communic.ate with the central station for performing certain betting and housekeeping tasks.

Table I below lists the keys available for use on the keyboard by symbol printed thereon and by key name, When the key is actuated, the display shown on the player's station and the central station, if appropriate, is listed. The key function(s) is summarized in the right hand column. Table II lists the indicator lamps by color and the meaning of the same with respect to a particular player's station or status.

TABLE I

| Key Symbol(s) | Name | Display/ Indictator | Function |
|---|---|---|---|
| C | CLEAR | Zero | Clears player station display and station input memory to Zero |
| . | Decimal Point | Decimal | Separates dollars and cents in display |
| WA | Wealth Account | $ | Displays wealth of player at Player's Station only |
| INC/WA | Increase Wealth Account | $ | $ + INC/WA increases wealth account of player |
| DEC/WA | Decrease Wealth Account | $ | $ + DEC/WA decreases wealth account of player |
| PA | Personal Account | $ | Displays total amount bet by player in current game |
| BA | Bet Account | $ | Displays amount to stay in |
| HA | Hand Account | $ | Largest personal account in hand |
| OS/ACK | House Acknowledge | # | # + OS/ACK by Bank or House indicates house mode for named player station |
| | Player Acknowledge | | OS/ACK by player adds or substracts wealth attributed by house in WA above |
| OUT | Out | Green light goes out | Player withdraws from game |
| BET/RAISE | Bet/Raise | $ | Bet and/or Raises Display sets new WA, allows game entry in ante phase |
| | Win/ Acknowledge | $ | Acknowledges a win to permit transfer of pot to winning player's wealth account |
| | New Game | Zero | House starts new game |
| 0-9 | Numbers | $ or # | To display $ To indicate a player station # |
| ABORT | Abort | Zero | exit house or bank operation without transaction |

Legend
$ = Numbers indicative of money or points
# = Numbers indicative of station identity.

TABLE II

| INDICATOR LAMPS | PLAYER STATION STATUS IF LIT |
|---|---|
| Green | Player In |
| White | Player Up |
| Amber | Wealth Exceeded |
| Red | Win |

Some of the keys have multiple functions, noted above, depending upon whether it is used by the individual player as a player or by the house in performing housekeeping tasks hereinafter described.

In a game of poker or other game of chance where players compete against each other using chips and the like to represent wagers, the players purchase the chips from the house or bank in various denominations, and use the chips for making wagers in one or more games by placing the chips in a pot. Normally, a game begins, if the rules so provide, by each player placing an ante or initial bet in the center of the table or pot. Thereafter, the cards are dealt, and the player to the left of the dealer has the option to check, meaning pass, or bet a specific amount of money or drop out. The first player to bet places chips representing the wager in the pot. Other players wishing to remain in the game must meet the initial bet. In addition, any player or players in succession may raise the bet by adding to the bet amount an additional amount representing a raise. Players thereafter must meet the initial bet plus the aggregate of raises in order to stay in. Play continues until all of the players but one have dropped out. The remaining player is declared the winner and sweeps the pot, thereby accumulating wealth.

As hereinbefore described, the winning player normally stacks the chips in accordance with the denominations while another hand is dealt. Play may continue until all of the players leave the table or until an agreed time. If a player decides to drop out of the game, he may cash the chips by returning the same to the house in exchange for the equivalent value in money. At the end of play, the chips are all cashed and stacked and returned to a receptacle for use at another time.

In the present invention, the game of poker is played in essentially the same way as hereinbefore described. Players ante to enter the game, receive cards, place and raise bets, drop out and ultimately a winner is declared. The difference is that, with the present invention, no chips change hands because the device tallies and keeps track of the amounts represented in each player's account and the pot in accordance with the normal rules of poker.

Banking Phase

In order to initiate the first game, the system is turned on. At this state, the object is to distribute wealth to the players in a way similar to the distribution of chips. When the system is turned on, one station, for example, player station 14-1 is automatically designated as the house. One at a time, the players deposit funds with the bank or house. Thereafter, the person operating the bank or house player station 14-1 presses the player station number (#) depositing money and OS/ACK. This conditions the particular player station, e.g., 14-2, to receive a credit for the amount deposited. The house hits the CLEAR button, the amount deposited, e.g. $1,000.00, and then hits the INCR/WA button to transfer the funds to the account of the player station in question. The amount then appears on the display of the player station receiving the wealth. That player station player hits his OS/ACK key to acknowledge that the amount is correct and received. If the player thereafter hits his WA button for wealth account, the $1,000 should display on his individual display only. The aforegoing series of operations is repeated for each player entering the game.

Ante Phase

The next stage of play is the actual beginning of the game. Games normally begin with the ante phase. All eligible players enter the game at this time. The players may enter in any order because sequence of play is not enforced at this time. The entry of the first ante bet begins the game. For example, player station 14-2 hits 10 and the RAISE/BET key. $10 appears on the pot display of the central station, player station 14-2 IN/OUT green light turns on and any remaining wealth at player station 14-2 appears on his individual display. In the example above, if player two had $1,000 in the original wealth account, $990 would appear, representing the original wealth amount less the $10 ante.

All players who accept the initial ante now become part of the game in progress. Such players may accept the ante by merely hitting their respective RAISE/-BET key which causes the pot amount to increase $10 as each player enters the game and the green light for the particular player to go on. Each player receives an indication of his or her remaining wealth and players may drop out by pressing the OUT button.

Raise/Bet Phase

After the cards are dealt, the first active player who makes a bet starts the Raise phase of the game. For example, player station 14-4 may open with a $10 bet. The $10 is added to the previous amount in the pot display and the remaining wealth is displayed on the display of the player making the bet. As in the ante phase above, any player may leave the game at any time by pressing the OUT buttom. Once this occurs, the player may not re-enter that particular game. This is true for any game phase.

After the first player bets, the Player Up or white light appears on the station for the next eligible player to the left. If, for example, the player at station 14-4 began the game or opened with a bet and the player at station 14-5 had previously droppdd out, the next eligible station player would be the player at 14-6. The Player Up light at 14-6 would therefore go on. Player six may call the bet by merely pressing the RAISE/-BET key, or he may raise the bet by hitting numbers indicating the amount of the raise and the RAISE/BFT key. (For example, 2 and 0 for $20 and the RAISE/-BET key). The original $10 bet plus the $20 raise will be added to the pot display. In the example above, the bet is now $30 to the next eligible player. This amount will enter in his display along with the energization of the white light. Assume that there are only three players in this particular game, e.g. 1, 4 and 6, player one must meet the initial $10 bet plus the $20 raise in order to stay in the game. Thus, $30 appears at his display when his white Player Up light goes on. When it is the 4th player's turn, because player four had made the initial bet, he need only to match the $20 raise. Therefore, $20 appears in his display along with the white light indicating that it is his turn to either call or raise the bet or go out. Calling or raising the bet activates the next eligible player station.

Win Phase

The betting pattern continues as the game is played with the cards until the winner is declared. In an actual game of poker, if all the bets are called, according to the rules, the player making the last bet must show his cards to the other players. If the cards are winners, the other players hit their respective OUT buttons. As a result, the red WIN light goes on at the station of the called player who had not dropped out. If another player shows better cards, the called player and other players hit their respective OUT buttons and the WIN light lights at the player showing the better cards. The final pot for winning amount is displayed in the pot display and in the winner's station. The winner hits the RAISE/BET key to acknowledge and accept winnings as indicated on the pot of the central display. This amount is added to his wealth amount, which is displayed to him.

It should be understood that multiple winners may be declared (i.e., a shared pot). For example, the sequence may be initiated by a decimal numeral key stroke indicative of the pot percentage claimed as won preceding the OUT key stroke. When all players are either out or claiming to be winners and the values claimed equal one hundred percent of the pot displayed, the winnings are displayed in the respective winner's display and each acknowledges the amount won.

New Game Phase

A new game is begun when the player representing the house hits the RAISE/BET key. At that time, all of the indicator lights are turned off, the pot display is cleared, and everyone's remaining wealth is displayed in their individual respective displays. The first player thereafter making an ante bet starts the betting process again.

Cashing Out

Any player may cash out by requesting the same from the house. The house presses the player station number, e.g., 2, plus the OS/ACK key. The house hits the CLEAR button and the amount withdrawn, e.g. $1595 and the DEC/WA (Decrease Wealth Account) button. The player examines this figure and, if correct, he hits the OS/ACK to acknowledge that the transaction is correct. His remaining wealth appears on his display. If the decremented amount equals the wealth account, $0 is displayed. Thus, the player is effectively out of the game and cannot bet unless and until the wealth account is replenished

. Wealth Exceeded

In the preferred embodiment, any time a player exceeds his wealth amount by making a bet which is more than the amount in his wealth account, at that time the amber WEALTH EXCEEDED light for the player goes on and the player is precluded from making a bet. The player may increase his wealth amount by paying in as described above, in the banking phase, after which the player may make a bet.

It should be understood that the present invention may be used as a tallying device in any game in which players compete against each other or the house, as in Black Jack. However, a different program must be provided to accomplish such result. The present invention is most conveniently and preferably applied to the game of poker in various forms as hereinbefore described.

GAME LOGIC AND FLOWCHARTS

Figure 6:
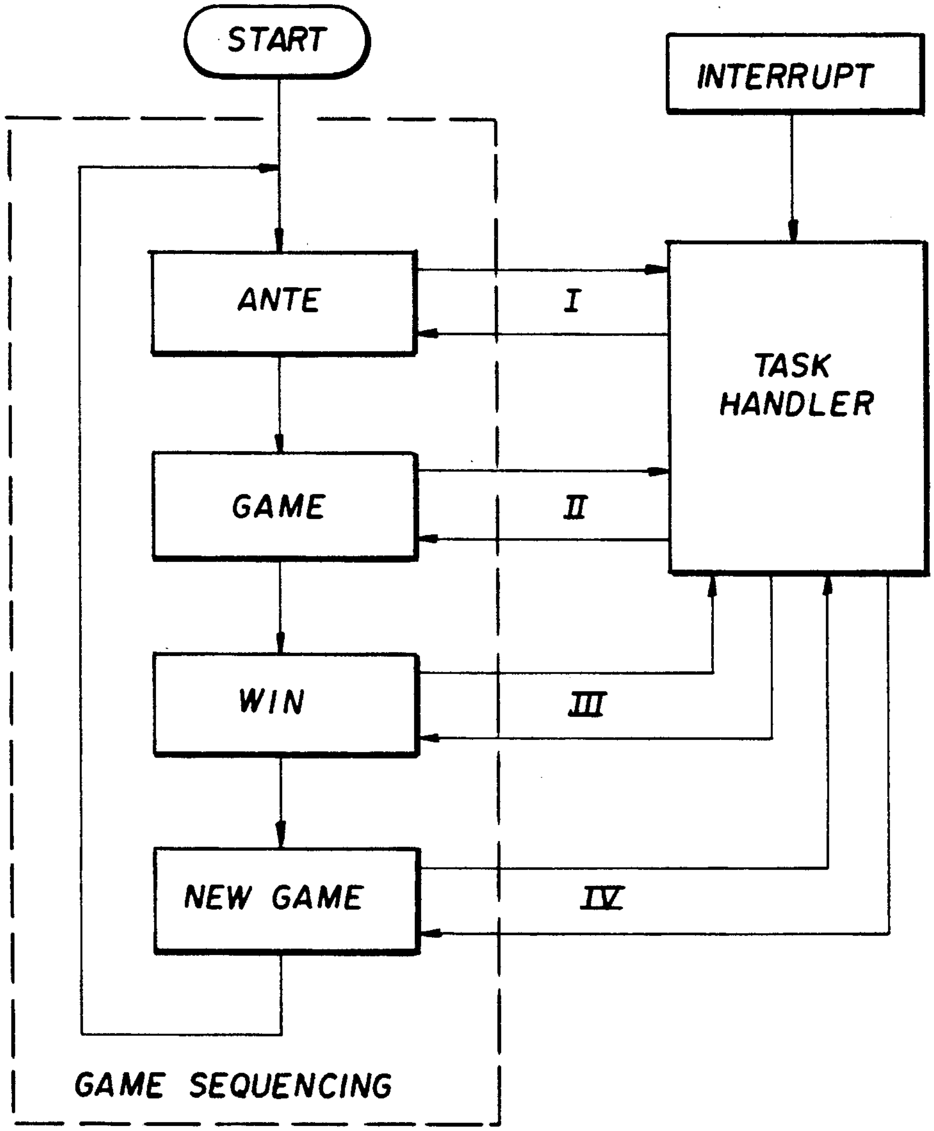
FIG. 6 is a block diagram illustrating game and flow chart sequencing for various game phases of the present invention.
Figure 7A:
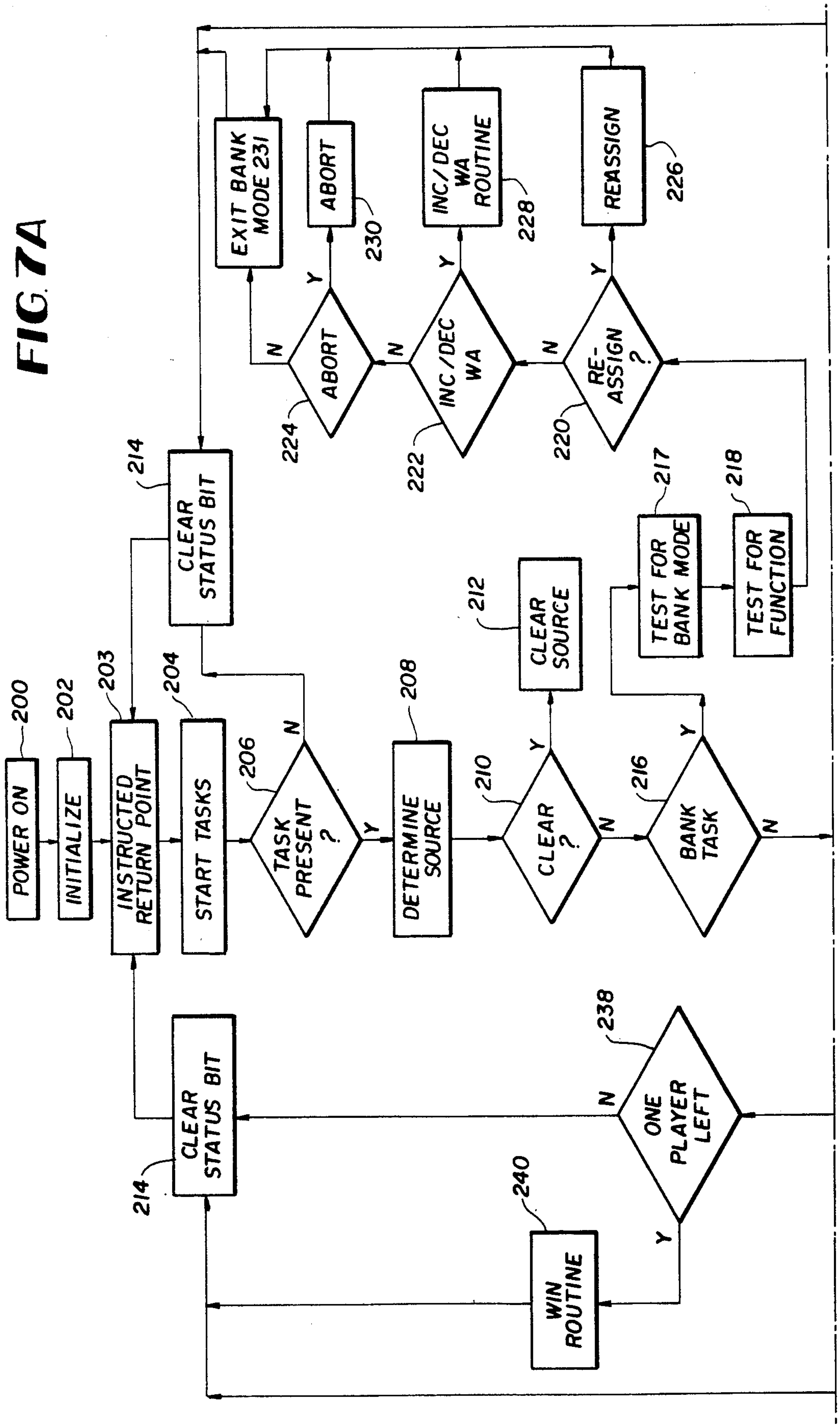
FIGS. 7A–7B from top to bottom make up a flow chart illustrating program functions of the gaming device of the present invention.
Figure 7B:
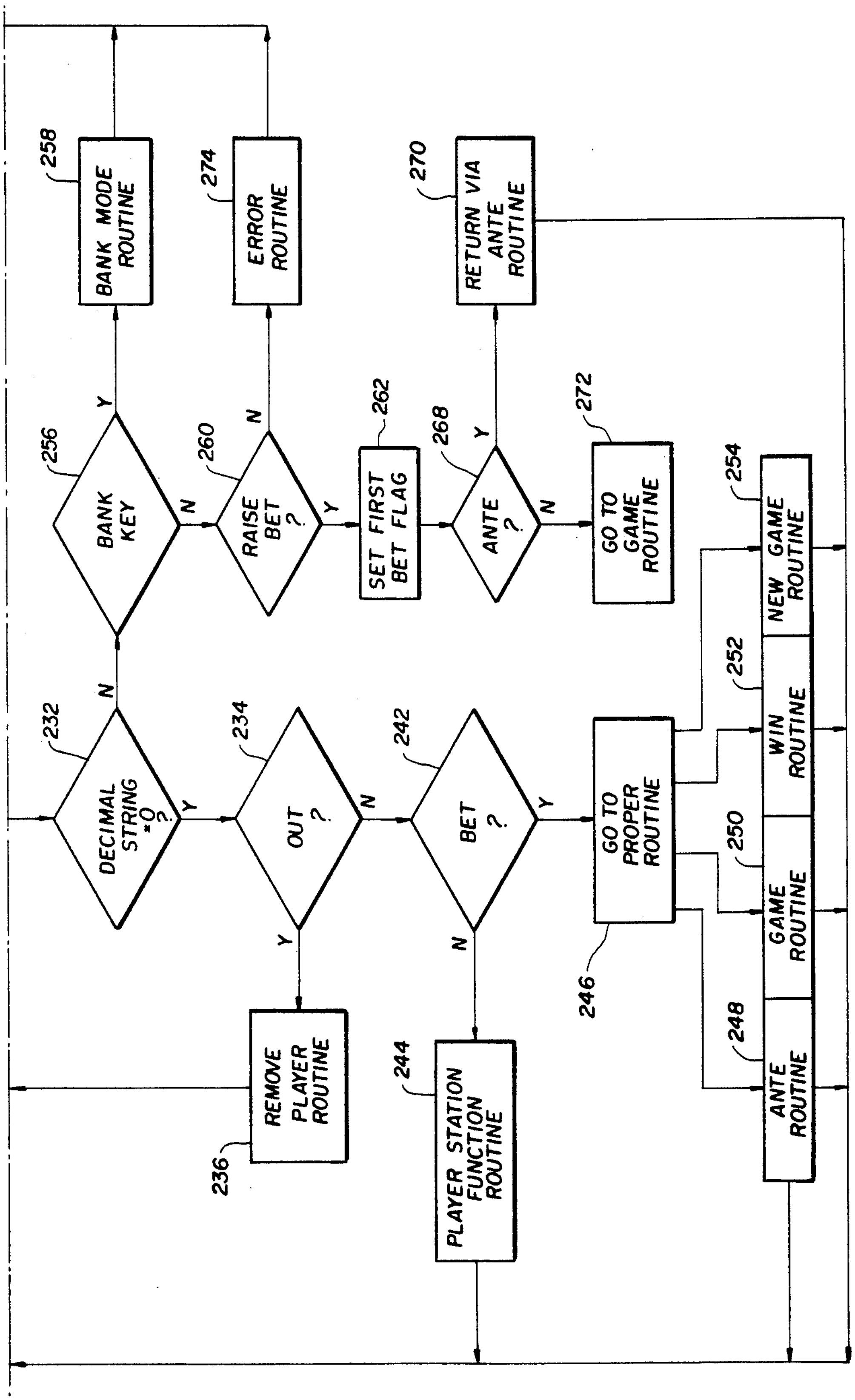

In FIGS. 7A-7B and 8A-8C, there are shown two flow charts of the system. In FIG. 6, GAME SEQUENCING is shown. After start up, the system is designated to move through a series of game phases in an ordered sequence In the ANTE PHASE, random entry into the game is allowed. Ante bets are processed between the Taskhandler and Ante software in primary loop I. If any player in the game initiates a raise over and above the initial ante, the GAME SEQUENCING moves into GAME software. Thereafter, bets and raises are strictly ordered and random entry is forbidden. Thereafter, system software moves between game functions and the Taskhandler functions in Loop II. In the preferred embodiment, after all bets and raises have been made and all but one player has been eliminated, the GAME SEQUENCING goes into the WIN software. Win acknowledgement tasks associated with the win phase of the game are processed in Loop III. After all wins are acknowledged, GAME SEQUENCING moves to the NEW GAME SOFTWARE upon actuation of the RAISE/BET (new game) key by the house. Tasks are processed in Loop IV. Once all new game tasks are accomplished (e.g. calculations and initializations are complete), GAME SEQUENCING goes back to ANTE as shown. The system thus controls the instruction sets available for each phase of the game. In FIG. 7A–7B a more detailed general system flow chart is shown. Operations are written in rectangular boxes and questions or inquiries are written in diamond-shaped boxes in accordance with known flow chart drafting techniques.

During the start up of the game, individual players pay in and increment their wealth accounts in accordance with the previously described sequences. Thereafter, players enter a game playing sequence. The sequence includes the ANTE phase, a GAME (raise/bet) phase, a WIN phase and a NEW GAME phase as hereinbefore described.

The system software as outlined in the flow charts of FIGS. 6–8 anticipates the various phases. Power On at 200 indicates that the system has been initially turned on. The Initialization operation at 202 results from a reset pulse from the CPU 26 for initializing the various memory devices and the lik to an initial condition. Further, memory displays and the like are initialized to begin the game e.g., the game status lamp registers are cleared in memory and then the various game status lights are turned off, indicating no activity.

The system goes to Instructed Return Point at 203 after initialization at 202. Because the system cycles through the various loops I–IV, it has instructions in software for cycling the instructions which, in effect, skip earlier instructions which are not needed. Instructed Return Point 203 is a flow chart routing mechanism for instructions which will be further discussed hereinafter.

Start task function 204 begins a sequence of tasks, i.e., routing various program sequences to sub-routines and the like. The system begins in ANTE phase. See FIG. 6. A Task Present inquiry at 206 asks the system whether a task has been initiated. If the response is NO, as indicated by N, the system loops back to the Start Tasks routine at 204. If the answer is YES, as indicated by the Y, the system proceeds to a Determine Source routine at 208. The question is then asked whether the task is a Clear task at 210 or something else. A Clear task means that the system shall operate the Clear Source operation at 212 through a Clear Status Bit function at 214 and return to the Start Task function at 204.

The Clear Status Bit function 214 is a housekeeping and programming task which is known in the art. Although not always noted, the Clear Status Bit function 214 is shown in the drawings at various places, and it should be understood that it occurs before each cycle.

If the Clear inquiry 210 is a negative, the question is then presented whether the function or task is a Bank Task at 216. If the answer is affirmative, a Test for Bank Mode 217 and a Test for Function at 218 is made for the function. Such functions include Reassign the house or banking station at 220, Increase/Decrease wealth account WA at 222, and an Abort at 224. The affirmative of Reassign inquiry is coupled to Reassign Routine at 226. After completion, the system returns to the Start Tasks at 204 through Exit Bank Mode 231 and Clear Status Bit at 214. Similarly, Increase/Decrease WA Routine at 228 operates in response to an affirmative inquiry from the Inc/Dec WA Inquiry at 222. Finally, if an error is made in the sequencing of keys, the operator may hit the ABORT key which enables an affirmative of Abort Inquiry at 224 to operate Abort Routine 230 and return to Start Tasks 204 via the Exit Bank Mode 231, Clear Status Bit 214 and Instructed Return Point 203. Further, a negative response to Abort Inquiry 224 at this stage of play causes the system to Abort also. This appears redundant. However, this software sequence avoids a potential program loop by default.

If the Bank Task inquiry at 216 is negative, the system inquires if Decimal String=0 at 232. The Decimal String is a representation of the series of numbers which precede the operation of a function key. If numbers do not precede the function key code, the answer is affirmative. For example, if a player wishes to make a bet of $10, the player activates the 1 and 0 keys and then the RAISE/BET key. The Decimal String is not equal to zero in this case. If, however, a player wishes to meet a bet, but not raise it, the player merely activates the RAISE/BET key. In such case, Decimal String is equal to zero. By default, the system automatically credits the pot in the amount of the unstated bet. The Decimal String is a way of determining whether the particular task is purely a betting task or some other player task.

If the Decimal String=0 Inquiry 232 is affirmative, it indicates that a bet or ante has been met; a bank function is occurring; or a player function is occurring. Out inquiry at 234 following Decimal String=0 inquiry asks whether the player is in or out. If the Player Out inquiry at 234 is affirmative, a Remove Player Routine 236 is employed. Thereafter, a question is asked at 238 whether there is One Player Left. If the response is negative, the system goes to Clear Status Bit 214 and returns to Start Tasks at 204. If the response is affirmative, Win Routine 240 is activated. The red light at the winner's station is activated and the pot amount is displayed in the central display and at the particular player station as well as the central display. As hereinafter described, the system deals with a win situation by interaction with the bank and the particular player described below.

If the Out? question at 240 is negative, i.e., if the player is not taking himself out of the game, then the function following the Decimal String=0 inquiry 232 may be a bet. The Bet Key inquiry at 242 may be affirmative or negative. If negative, the system goes to Player Station Function Routine 244. Such a player station function may be to acknowledge an increase or decrease in the wealth account or re-assignment from the house or bank. The particular inquiries are not shown in the drawing because it is believed a verbal explanation is sufficient and the drawing may be unduly cluttered thereby. If the Bet inquiry at 242 is affirmative, the system moves to go to proper routine (as determined by instructed return point) at 246. In this way the software returns to the phase of the game it has been instructed to be in at such time, i.e., Ante Routine 248, Game (Bet Raise) Routine 250, Win Routine 252 and New Game Routine 254. If the system is in any of the foregoing routines, it may loop back through the Task-handler via start tasks at 204. Once the system moves from the Ante Routine 248 to the Game Routine 250, it does not return until a new game starts. Similarly, if the system moves to the Win Routine 252, the loop back through Start Tasks 204 bypasses the Ante and Game Routines. Finally, in the New Game Routine 254, the system does the new game functions and returns to Start Tasks 204, by-passing the routines associated with win acknowledge, ante and raise bets. Each of the foregoing routines 248-254 is described hereinafter with respect to FIGS. 8A-8C. At present,however, further inquiries are required before this flow chart is satisfied.

If the Decimal String=0 inquiry at 232 is affirmative, it is apparent from the foregoing that a player is either performing certain player station functions or making a bet without a raise. If the Decimal String=0 inquiry 232 is negative, it is possible that certain house or banking functions are in process or a raise situation has occurred. For example, during a re-assignment, the house depresses a player station number and then a function key. Similarly, during an increase or decrease wealth account function, the house depresses numbers plus the function key for increasing or decreasing numbers plus the function key for increasing or decreasing the wealth account. Thus, the Decimal String preceding the function is not equal to zero. (Also, in a raise bet situation, a player raises a bet by first placing the amount of the wager or raise on the keyboard and then hitting the RAISE/BET key.)

In the situation where the Decimal String inquiry at 232 is negative, a Bank Key inquiry is made at 256. If affirmative, the system switches to Bank Mode Routine at 258. (A negative response to the Bank Key inquiry 256 indicates a betting situation). The system may not be in a betting mode and a bank mode at the same time. Thus, there is a check on the house mode to prevent cheating.

If it is a bank function, Bank Mode Routine 258 is executed and the system returns to the Start Tasks Routine at 204. In operating through such a Start Tasks Routine at 204, it can be seen from the flow chart that the system will run through Task present at 206, Determine Source at 208, Clear at 210, look at the Bank Task inquiry at 216, and Test for Bank Mode 217, and Test for Function at 218. The subsequent inquiries at 220 and 222 as well as the ABORT at 224 and Exit Bank Mode at 231 are made as hereinbefore described.

If the Bank Key inquiry 256 is negative, then a non-zero Decimal String is a Raise Bet situation. A Raise/-Bet inquiry is made at 260. If the answer is affirmative, a flag is set at Set First Bet Flag 262, and an Ante inquiry at 268 is made as to whether the Raise Bet is an Ante. If the answer is affirmative, return via Ante Routine 270 is operative to hold the system in Ante Routine at 248. If the answer is negative, the system moves to Go To Game Routine at 272 and then Go To Proper Routine at 246 as shown. Finally, if the Raise/Bet inquiry at 260 is negative, there must be an error and a system Error Routine 274 is operative to loop the system back to the Start Tasks at 204.

Select Game Phase

Figure 8A:
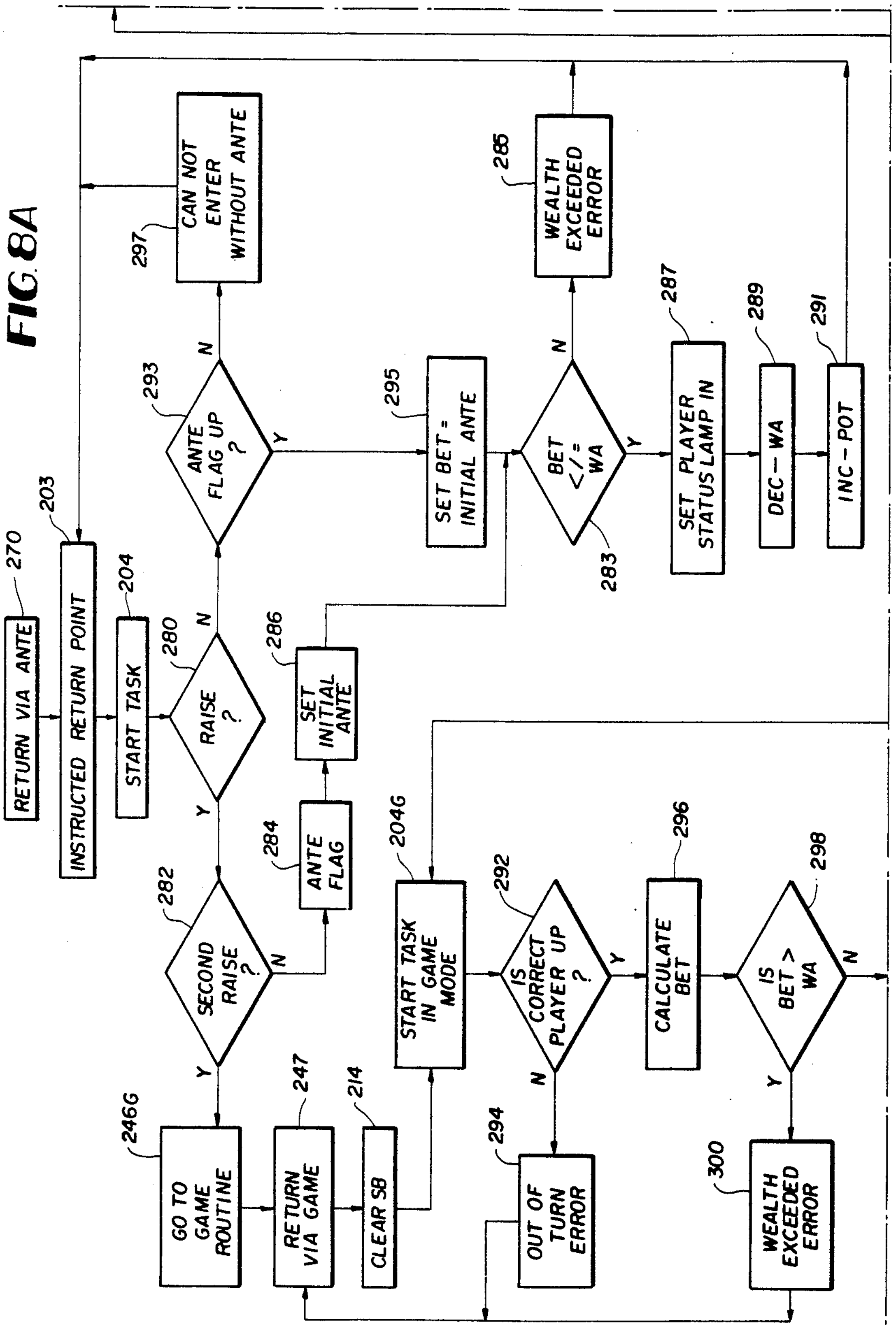
FIGS. 8A–8C make up a flow chart illustrating more details of program functions set forth in FIGS. 7A–7B.
Figure 8B:
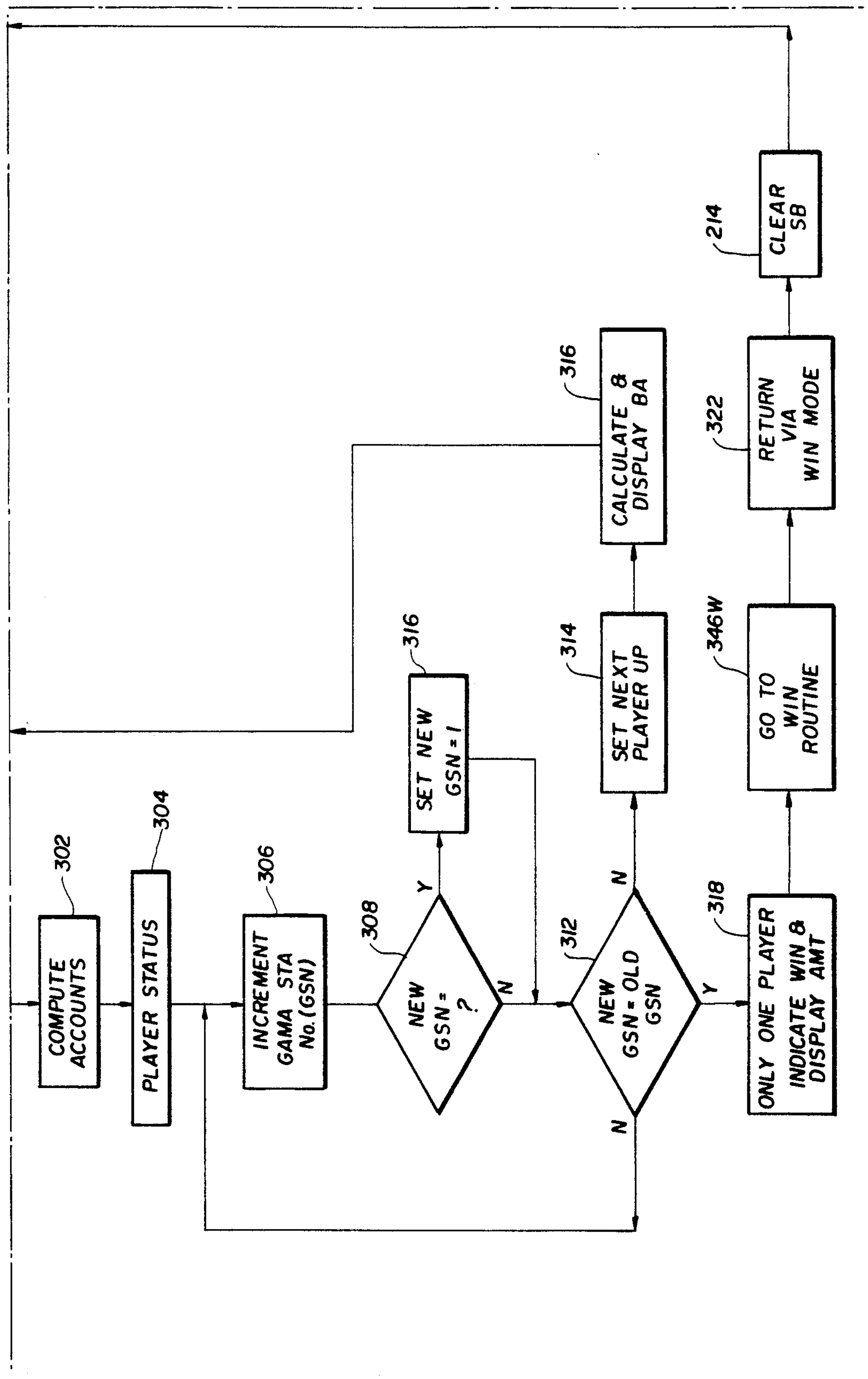
Figures 8C, 8D:
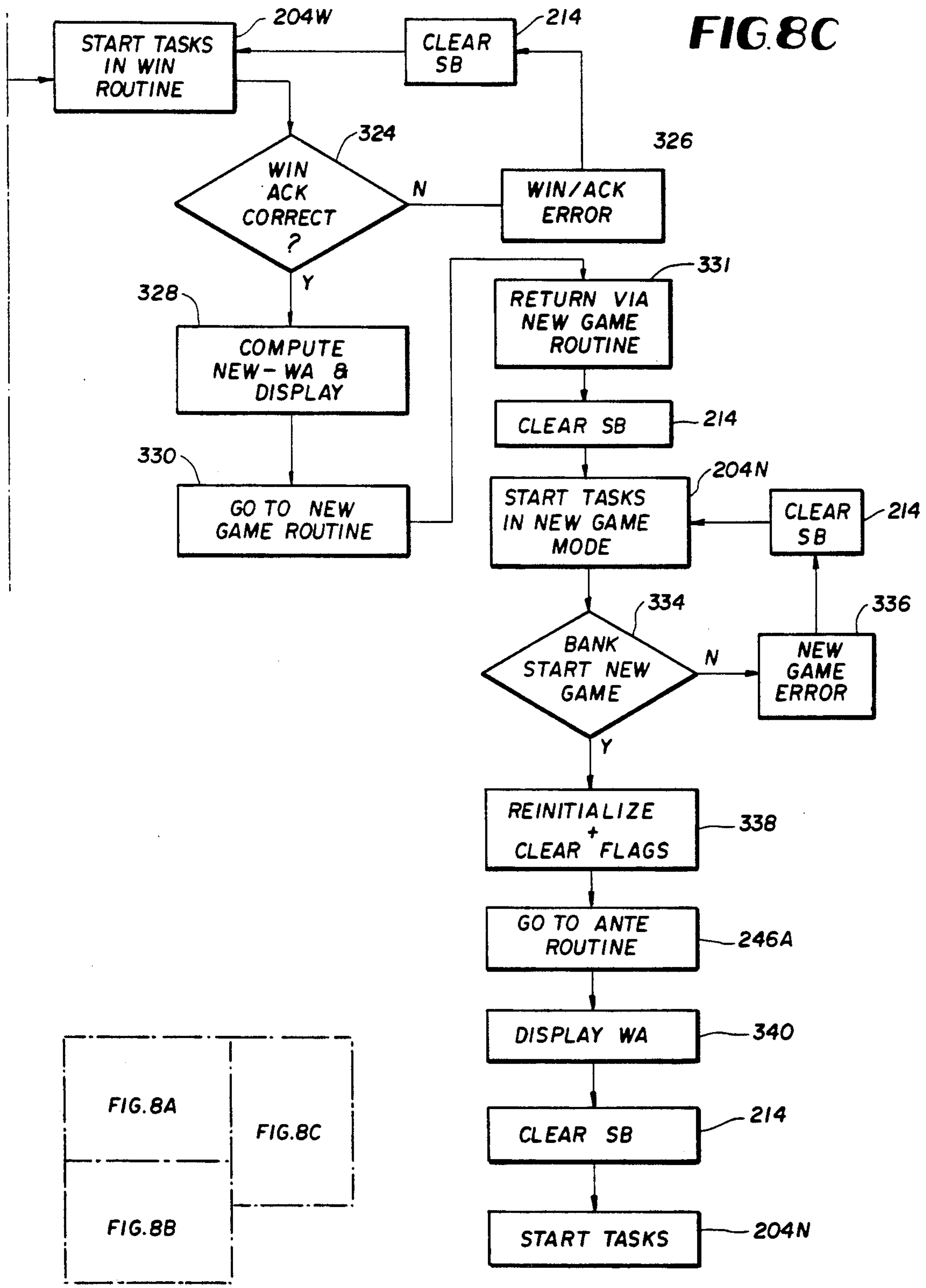
FIG. 8D is a chart showing the arrangement of drawings for FIGS. 8A–8C.

Referring now to FIGS. 8A-8C (see FIG. 8D for Drawing Arrangement), the flow chart resumes with Return Via Ante 270, Instructed Return Point 203, Clear Status Bit 214, and Start Tasks 204 illustrated in FIGS. 7A and 7B. As hereinbefore noted, once instructed to return to a particular game phase routine, the system stays in that routine until instructed to move on to another.

The above concept is illustrated in FIGS. 8A-8C as follows. In Ante Phase it is assumed that play is about to begin in such a way that players may ante in random order As hereinbefore stated the system interprets an initial ante as a first raise, because the pot starts at zero. Thus, a non-zero decimal string preceeding a player RAISE/BET key stroke is interpreted as a Raise. The question Raise ? at 280 initiates an inquiry or test to determine which of two possible returns is possible. For example, if the answer to the Raise inquiry at 280 is affirmative, such raise may be the first raise of the game e.g. the initial ante. It may, however, be a second raise, that is, an increase in the initial ante, not just a matching thereof. For example, if a player wishes to meet an ante, the player strikes the RAISE/BET only after the initial ante has been entered. Thus, the decimal string preceding the key stroke is zero and the system interprets the key stroke as a BET. In usual play, if after the players have all entered an ante, a player wishes to make an additional bet i.e. a raise, the player depresses the bet amount plus the RAISE/BET key. The system interprets this as a raise. If the ante has occured, this raise, occurring after the ante, is interpreted at inquiry 282 as a secon raise whereby the system exits or goes to game routine at 246G.

In the Game Phase, betting order is important. Therefore, once a bet is made, and a raise of such bet has been made, the order and sequencing is fixed. The system will not go to the game routine before ante bets are complete. Therefore, a negative response to the Second Raise inquiry at 280 means that the system is entering the ante phase, and the system produces a command to raise an Ante Flag at 284. In the ante phase a non-numerical raise/bet keystroke is merely meeting a bet or meeting the ante.

If the ante flag at 284 goes up, the system executes Set Initial Ante at 286 and moves to process the ante by inquiries whether the bet is less than or equal to the wealth account at 283. A negative response produces a Wealth Exceeded Error at 285 and a loop to return via ante 270 as shown. If the response to inquiry at 283 is affirmative, the player has sufficient funds or points to stay in and the player in status lamp at 287 is turned on. The player's wealth account is decreased at 289 and the pot is increased at 291. Thereafter, the system returns via ante 270.

After the initial ante, a negative response to raise inquiry at 280 results in a Has Ante Occurred? inquiry at 293. A positive response to the inquiry causes the system to execute Set Bet Equal to Ante at 295. Thereafter, processing proceeds as described above via the inquiry at 293. A negative response to Has Ante Occurred 293 produces an error at Cannot Enter Without Ante routine 297, because a player cannot ante nothing or zero in order to play, (i.e. first raise has not yet occurred).

The system continues to loop back to Return Via Ante 270 as long as the second raise has not occurred. Once it does occur, the system exits the Second Raise inquiry at 282, moves to Go to Game Routine 246G, return via Game Routine 247, and Clear Status bit 214 to Start-Tasks in Game Mode 204G via the Game Routine (i.e. Loop II in FIG. 6).

As mentioned above, after a second raise has been made player sequencing is important. Thus, an Is Correct Player Up inquiry is made at 292 after Start Tasks 204G. If the response is negative, an Out of Turn Error 294 occurs and the game sequences back to the Start Tasks 204G via the above noted loop. If the response to Is Correct Player Up at 292 is positive, then the bet is processed at Calculate Bet Routine 296. An Is Bet Greater Than Wealth Account Inquiry is made at 298 as to whether the player has exceeded his wealth. If the answer is affirmative, the Wealth Exceeded Error occurs at 300, sending the system to Start Task at 204G via Go To Game Routine 246G. If the response is negative, the Compute Accounts Routine at 302 (FIG. 8B) provides information as to the wealth amount, the bet amount, the pot amount, and other parameters.

For purposes of explanation, various error sequences are noted (e.g. Out of Turn Error 294 and Wealth Exceeded Error 300). However, the system software uses essentially the same error routine whenever an error occurs. That is, the system cycles back to the beginning of the loop where the error occurred and the player in error receives a display of all eights (888888) on his player station display.

After a bet is completed, a Player Status Routine 304 moves the player out of up status and increments to the next available player at Increment Game Station Number (GSN) 306. An inquiry is thereafter made at 308 as to whether the new GSN equals 9. A positive response engages Set New GSN=1 at 310. The logic is that because there are only eight player stations, if player 8 is the last one to make a bet, then the game must be moved up to the next player station, i.e., one. If the New Game Station Number GSN is not 9, the logic moves to the next inquiry as to whether the new GSN=Old GSN at 312. A negative response means that there is a player in the game available to make a bet. Therefore, the software executes to Set Next Player Up at 314 and Calculate and Display the Bet Account which displays the amount to stay in game on the player station and turns on his Player Up lamp, for the particular player and returns to Start Task at 204G, at which time the player may call the bet, raise the bet, or drop out in accordance with the game.

It should be understood that the system software can bypass a player station not in the game for functions, etc., but the system polls the stations in order. Then a station that is out is still counted, the GSN increments and the system moves on.

If the response to the question of whether the new GSN=Old GSN at 312 is positive, the system responds by executing Only One Player, Indicate Win+Display Amount 318. At such time the red light on the winning player station is activated and a display amount of the pot is transferred or displayed simultaneously in the pot display and in the player station display. The software then moves to Go To Win Routine at 346W, Return via Win Mode 322, Clear Status Bit 214, and the system moves on to the Start Task in the Win mode at 204W.

In the Win mode, the system inquires whether a Win Acknowledgement is Correct at 324 (FIG. 8C); that is, has the correct winning player pressed the Win Acknowledge button. If incorrect, Win Acknowledgement Error Routine 326 (similar to Errors noted Above) is executed, whereupon the system cycles back to the Start Task in the Win mode at 204W. If the proper player acknowledges the win by an affirmative at 324, the system goes to Compute New Wealth and Display Routine 328

The system moves then to the Go To New Game Routine at 330, return via New Game 331, Clear Status Bit 214, and the Start Tasks in the New Game Mode at 204N. A Bank Start New Game Inquiry is made at 334. A negative response means that the wrong player has pressed the RAISE/BET key for starting a new game and New Game Error Routine at 336 returns the system to the Start Tasks at 204 N. An affirmative response from the Bank Start New Game inquiry at 334 causes the system to Re-initialize and Clear Flags at 338 and Go To Ante Routine at 246A. Thereafter, the system displays each player's respective wealth account at the respective display for each player by means of Display Wealth Account Routine 340, Clear Status Bit 214, and the system recycles to the original Start Tasks at 204, shown in FIG. 7A.

There are other routines for operating various logic sequences in the game which are not described in these flow charts. However, it is believed that because certain routines such as calculating, adding, subtracting, multiplying and dividing are readily known by those skilled in the art, such a description herein is believed to be unnecessary.

Further, multiple winners may be accounted for by a non-zero decimal string preceding an OUT key stroke. Thus, the player is counted out but may be later counted as a winner requiring acknowledgement in the win phase.

It should also be understood that the system may provide other types of game play. For example, a player may purchase a wealth account at the rack track and place bets at a remote location from the betting window, such as his restaurant table. The system would require identifying the player station and player game entry device such as a credit card or card entry device.

What is claimed is:

1. An electronic data processing and display system for use in a game wherein a plurality of players wager in turn on the overall value of their respective holdings relative to the other players' holdings of combinations of tangible indicia acquired in turn from a preset array of indicia in a random sequence, each indicia uniquely representing a designed value and different combinations thereof denoting order of entitlement to win the game and the accumulated wagers of all players for that game, said system comprising plural player station means respectively associated with each player for entry of data representative of wealth for purposes of the game and amount of wager by the respective player at applicable points in the game, each of said player station means including station display means, central data processing means responsive to wager and wealth data entries by the respective players at applicable points in the game for computation and furnishing of data to all of the player station means, and to central display means operatively associated with said central data processing means, said furnished data being representative of the accumulated wagers of all players to that point in the game and the amount remaining to be wagered by the player associated with that player station means to remain in the game on that player's next turn for respective display on the central display means and each of the station display means, said furnished data further being representative of wealth of each player at that point in the game, means responsive to the furnished data representative of wealth of any player for limiting the display thereof to only that player station means associated with the player whose wealth is represented by that data and selecting means operatively associated with said central data processing means and with each of said player station means for selectively designating one of said player station means as a banking entity responsive to entry of initial wealth data from each of the player station means and to wager data and added wealth data entered at applicable points in the game to account for changes in each player's wealth data as the game progresses.

2. The system of claim 1, further including interrupt means operatively associated with said central data processing means for inhibiting said central dat aprocessing means from responding to data entries from any player station means other than a preempting player station means from which data entry has been commenced without competition from any of the other player station means, and for so long as such data entry continues from the preempting player station means.

3. The system of claim 1, wherein said central data processing means includes sequencing means for selectively activating each of said station display means to indicate the player whose turn it is to wager.

4. The system of claim 1, wherein each of said player station means further includes means for entry of data indicative of withdrawal of the associated player form the game, and wherein said central data processing means is further responsive to data entered from the player station means indicative of withdrawal of all players except one to add the data representing the accumulated wagers of all players up to that point in the game to the data representing the wealth of the remaining player.

5. The system of claim 4, wherein the furnished data representative of wealth of a player is furnished by the central data processing means to the player station means associated with that player to the exclusion of all others for display on the respective station display means upon entry of data from the last-names player station means indicating demand for such wealth data.

6. A dedicated electronic data processing system for a game in whic players successively wager against each other on hands of playing cards held by each player until a player is entitled to the cumulative amount wagered by virtue of holding the winning hand, said system comprising: plural sets of data entry and display stations, one set per player, for entry of data representing player purchased allocations for wagering and representing player decisions to remain in or withdraw from the game at applicable points in the game; a central data processing and display unit for selectively processing data entered from the individual stations on a non-interfering basis to perform at any point in time calculations including the then-current cumulative amount wagered, the then-current minimum amount each player must respectively wager to remain in the game, and the then-current purchased allocation remaining for each player and whether or not the amount wagered by the respective player exceeds that remaining allocation; and means responsive to the calculations for selectively directing the data representative of some of the calculations to only predetermined ones of the individual stations for display thereat and of others of the calculations to only the central unit for display thereat, whereby information is displayed or not to each of the respective players as an individual or as part of a group to preclude any player from obtaining a competitive advantage over any other player merely by virtue of the displayed information said central unit includes interrupt means for assisting in the selective processing of data from the individual stations on a non-interfering basis by suppressing data entered at any station until data being entered form a time prior thereto from another station is completed, said central unit further includes sequencing means for selectively activating the display at each station to alert the player whose turn it is to make a decision whether to remain in or withdraw from the game, said central unit is responsive to entry to data indicative of withdrawal from the game from all but one of the stations to add the calculation of then-current cumulative amount wagered to the remaining allocation applicable to that one station, said means for selectively directing is responsive to a data entry inquiring as to remaining purchased allocation from any station to direct the calculation thereof made by the central unit applicable to that station for display only at the last-named station, and means operatively associated with said central unit and with each of said stations for selectively designating one of said stations to act as a bank for the purchased allocations.

* * * * *